US012275093B2

(12) United States Patent
Cheng

(10) Patent No.: US 12,275,093 B2
(45) Date of Patent: Apr. 15, 2025

(54) METHOD FOR ATTACHING A TUBE TO A WORKPIECE

(71) Applicant: Paul Po Cheng, London (CA)

(72) Inventor: Paul Po Cheng, London (CA)

(*) Notice: Subject to any disclaimer, the term of this patent is extended or adjusted under 35 U.S.C. 154(b) by 141 days.

(21) Appl. No.: 18/175,664

(22) Filed: Feb. 28, 2023

(65) Prior Publication Data
US 2023/0201974 A1 Jun. 29, 2023

Related U.S. Application Data

(63) Continuation-in-part of application No. 16/821,104, filed on Mar. 17, 2020, now Pat. No. 11,597,032.

(51) Int. Cl.
B23K 1/00 (2006.01)
B23K 31/02 (2006.01)
B23P 6/04 (2006.01)

(52) U.S. Cl.
CPC ............. B23K 31/027 (2013.01); B23P 6/04 (2013.01)

(58) Field of Classification Search
CPC .. B23K 20/1205; B23K 20/129; B23K 20/26; B23K 2101/06; B23K 2101/10; B23K 13/015
See application file for complete search history.

(56) References Cited

U.S. PATENT DOCUMENTS

| 4,103,815 A | 8/1978 | Yokokawa et al. |
| 4,555,053 A | 11/1985 | Persson et al. |
| 5,208,443 A | 5/1993 | McGaffigan |
| 5,240,167 A * | 8/1993 | Ferte .................... B23K 20/129 228/114.5 |
| 5,699,955 A | 12/1997 | Shimizu et al. |
| 5,785,805 A | 7/1998 | Fix, Jr. |
| 5,831,252 A | 11/1998 | Shimizu |
| 6,199,746 B1 * | 3/2001 | Dupree ................... F01D 5/005 228/119 |
| 6,454,156 B1 * | 9/2002 | Taras, Jr. ................. F01D 5/18 228/119 |

(Continued)

FOREIGN PATENT DOCUMENTS

CN 1976777 A 6/2007

OTHER PUBLICATIONS

European Search Report for the corresponding EP Application No. 21772120.8 dated Apr. 2, 2024.

Primary Examiner — Erin B Saad

(57) ABSTRACT

A method of attaching a tube having a tube wall defining a tube channel therein to a workpiece having a workpiece wall. A workpiece opening defined by a workpiece opening wall surface is formed in the workpiece wall. A tube engagement surface is formed on the tube wall for engagement with the workpiece opening wall surface. A workpiece heated portion in the workpiece, and a tube heated portion in the tube, are heated in a non-oxidizing atmosphere by energized heating elements to a hot working temperature. The tube is subjected to an engagement motion, moving the tube engagement surface relative to the workpiece opening wall surface. While the heated portions are at the hot working temperature, and while the tube is subject to the engagement motion, the tube engagement surface is pressed against the workpiece opening wall surface, for plastic deformation of the heated portions, to create a metallic bond.

7 Claims, 26 Drawing Sheets

(56) References Cited

U.S. PATENT DOCUMENTS

| | | | |
|---|---|---|---|
| 6,637,642 B1 | 10/2003 | Lingnau | |
| 7,086,960 B2 | 8/2006 | Huang et al. | |
| 7,348,523 B2 | 3/2008 | Slack et al. | |
| 7,600,666 B2 | 10/2009 | Rabinovich | |
| 7,752,728 B2 | 7/2010 | Schedler et al. | |
| 7,759,597 B2* | 7/2010 | Bibo | B23K 33/006 219/112 |
| 7,931,184 B2 | 4/2011 | Lingnau et al. | |
| 8,336,755 B2 | 12/2012 | Bray et al. | |
| 8,863,371 B2 | 10/2014 | Brouwer et al. | |
| 8,998,067 B2* | 4/2015 | Lehr | B23K 20/129 228/2.1 |
| 9,644,769 B1 | 5/2017 | Cheng | |
| 10,288,193 B2 | 5/2019 | Cheng | |
| 11,413,699 B2* | 8/2022 | Cheng | F16L 13/02 |
| 11,577,295 B2* | 2/2023 | Cheng | B23K 13/015 |
| 11,597,032 B2* | 3/2023 | Cheng | B23K 20/002 |
| 11,717,911 B1* | 8/2023 | Cheng | B23K 20/002 228/219 |
| 2004/0200883 A1* | 10/2004 | Staheli | B29C 66/1222 228/114.5 |
| 2009/0242613 A1* | 10/2009 | Kawaura | B23K 13/015 228/2.1 |
| 2010/0108666 A1 | 5/2010 | Gafri et al. | |
| 2011/0284523 A1 | 11/2011 | Hiroyama et al. | |
| 2014/0191016 A1* | 7/2014 | Lehr | B23K 20/1205 228/114.5 |

* cited by examiner

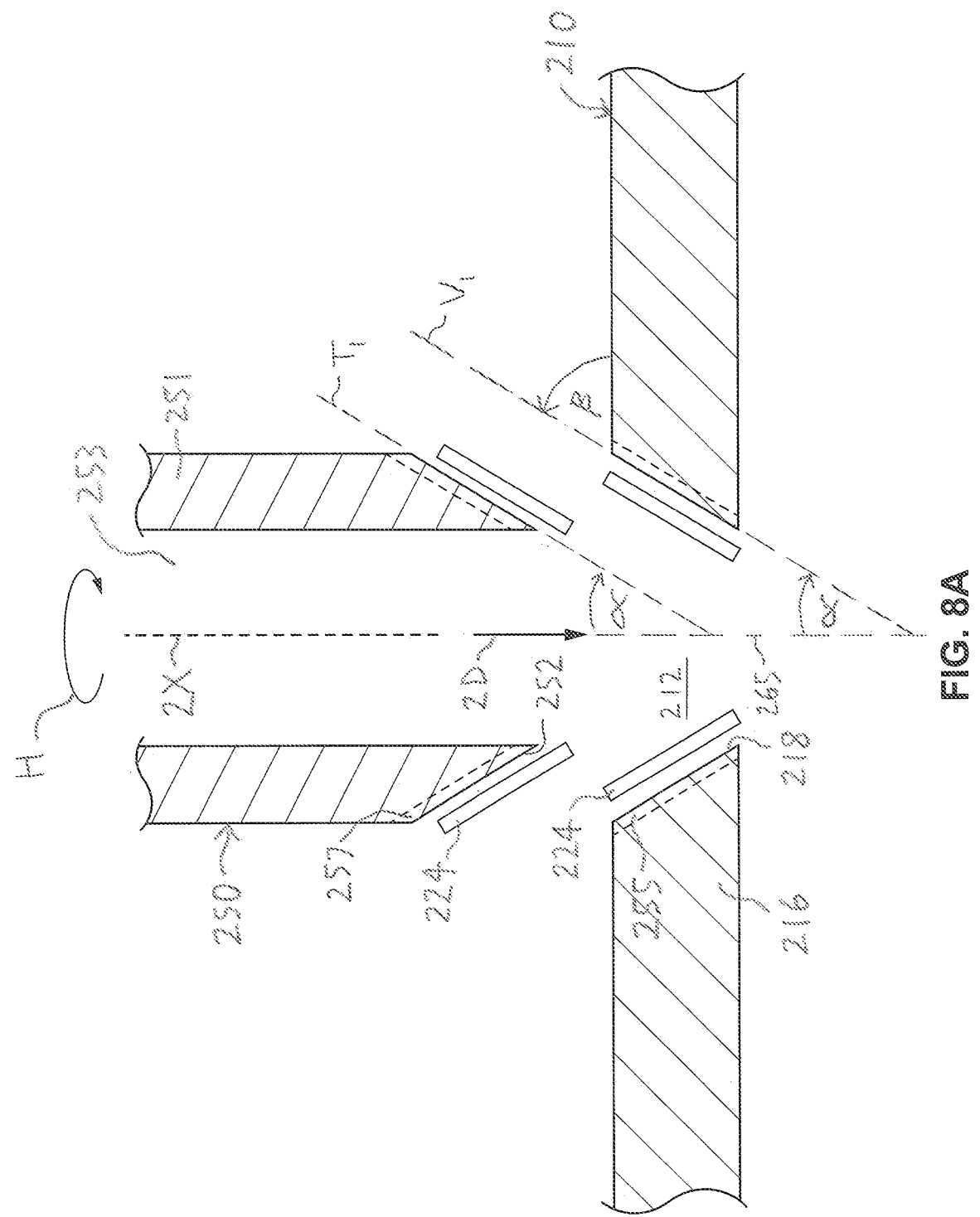

METHOD FOR ATTACHING A TUBE TO A WORKPIECE

CROSS-REFERENCE TO RELATED APPLICATIONS

This application is a continuation-in-part of U.S. patent application Ser. No. 16/821,104, filed on Mar. 17, 2020, the entirety of which is hereby incorporated herein by reference.

FIELD OF THE INVENTION

The present invention is a method for attaching a tube to a workpiece.

BACKGROUND OF THE INVENTION

In the prior art, a tube or pipe 10 of the prior art may be formed so that it includes a longitudinal opening 12 along its length (FIGS. 1A, 1B). The tube or pipe 10 may be formed by bending a relatively thick piece of steel, leaving the opening 12 along its length. The known methods for filling the opening typically result in a "heat-affected zone" (not shown) along the edges of the longitudinal opening 12 (FIGS. 1A, 1B). As is known, the heat-affected zone is an undesirable consequence, as the heat-affected zone is a generally weakened part of the tube.

In FIG. 1C, a partially cut-away view of a damaged tube or pipe 10' of the prior art is illustrated. (As will be described, embodiments of the invention are illustrated in the balance of the attached drawings.) The tube or workpiece may be subjected to various types of damage. In the example illustrated, a girth crack or opening "$C_1$" (i.e., at least partially radial) and an elongate generally axial crack or opening "$C_2$" (i.e., at least partially parallel to the longitudinal axis of the tube 10') have been formed in the tube 10'. However, the known methods of filling these cracks or openings would have the disadvantage that heat-affected zones would be created in the tube 10', which would weaken the tube 10'.

Solid state welding, in which one of two heated metal tubes is rotated when the tubes are engaged to weld the tubes together end-to-end, is disclosed in U.S. Pat. No. 6,637,642. Among its benefits, solid state welding may achieve a weld without creating heat-affected zones in the tubes that are joined together using this technique. The ends of the tubes form a metallic bond, with a relatively uniform crystalline structure. However, solid state welding requires the application of substantial heat and force, and has not been utilized in repairing or otherwise modifying metal workpieces having a variety of configurations.

SUMMARY OF THE INVENTION

For the foregoing reasons, there is a need for a method and a system for attaching a tube to a workpiece that overcome or mitigate one or more of the deficiencies or disadvantages of the prior art.

In its broad aspect, the invention provides a method of attaching a metal tube having a tube wall defining a tube channel therein to a metal workpiece having a workpiece wall. The method includes forming a workpiece opening in the workpiece wall, the workpiece opening being at least partially defined by a workpiece opening wall surface in the workpiece wall. A tube engagement surface is formed on the tube wall. The tube engagement surface is formed for engagement with the workpiece opening wall surface.

Next, one or more heating elements are positioned in predetermined positions relative to the workpiece opening wall surface and the tube engagement surface. The heating elements are energized in a non-oxidizing atmosphere. With the energized heating element, in the non-oxidizing atmosphere, a workpiece heated portion is heated to a hot working temperature, at which the workpiece heated portion is at least partially plastically deformable. The workpiece heated portion extends into the workpiece wall from the workpiece opening wall surface.

With another energized heating element, in the non-oxidizing atmosphere, a tube heated portion is heated to the hot working temperature, at which the tube heated portion is at least partially plastically deformable. The tube heated portion extends into the tube wall from the tube engagement surface.

While the workpiece heated portion and the tube heated portion are at the hot working temperature, the tube is subjected to an engagement motion, to move the tube engagement surface relative to the workpiece opening wall surface. Also, while the tube is subjected to the engagement motion, and while the workpiece heated portion and the tube heated portion are at the hot working temperature, the tube is also subjected to a translocation motion, to push the tube engagement surface against the workpiece opening wall surface while the tube is subjected to the engagement motion.

While the tube is subjected to the engagement motion, and while the tube heated portion and the workpiece heated portion are at the hot working temperature, the tube engagement surface is pressed against the workpiece opening wall surface, to cause plastic deformation of the workpiece heated portion and of the tube heated portion as they engage each other, for creating a metallic bond between the tube and the workpiece. The tube and the workpiece are then allowed to cool, to bond the tube and the workpiece together.

BRIEF DESCRIPTION OF THE DRAWINGS

The invention will be better understood with reference to the attached drawings, in which:

FIG. 8A is the cross-section of the tube and the workpiece of FIG. 4B, drawn at a larger scale;

DETAILED DESCRIPTION

Figure 1A:
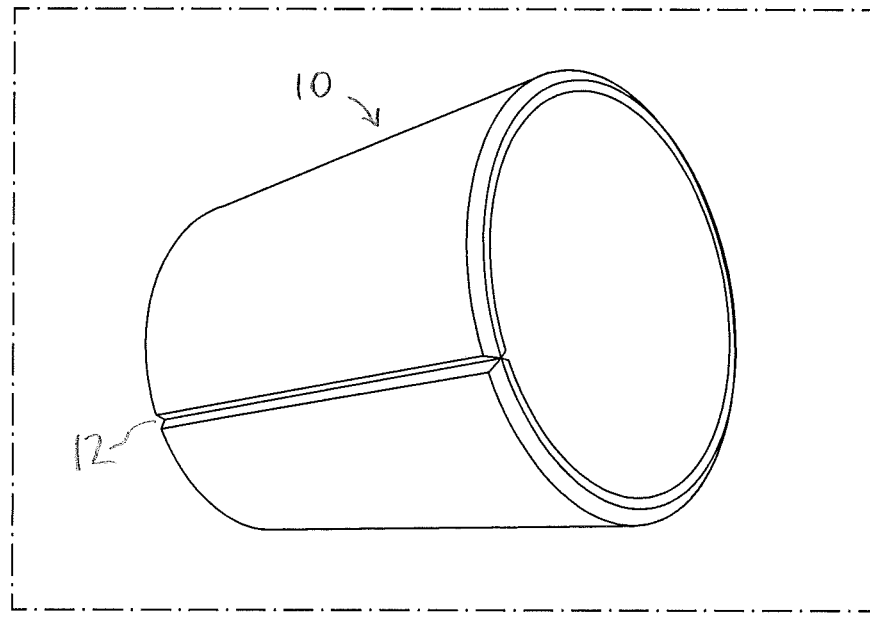
FIG. 1A (also described previously) is an isometric view of a metal tube of the prior art formed with a longitudinal gap therein.
Figure 1B:
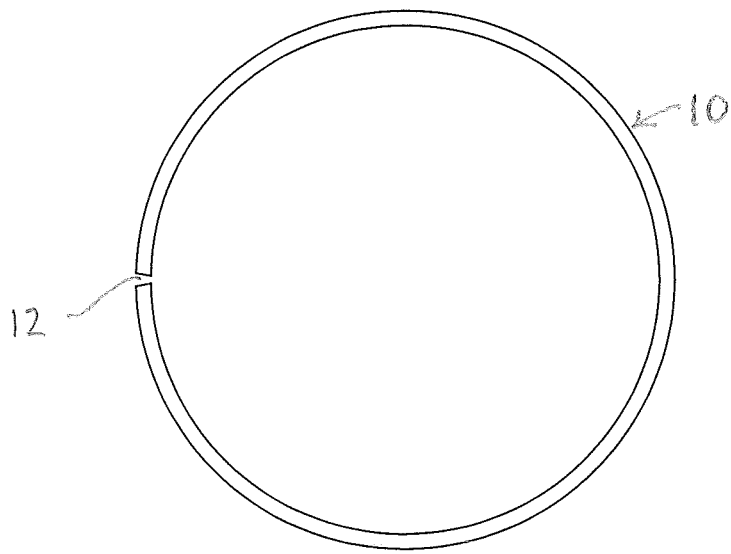
FIG. 1B (also described previously) is a cross-section of the tube of FIG. 1A, drawn at a larger scale.
Figure 1C:
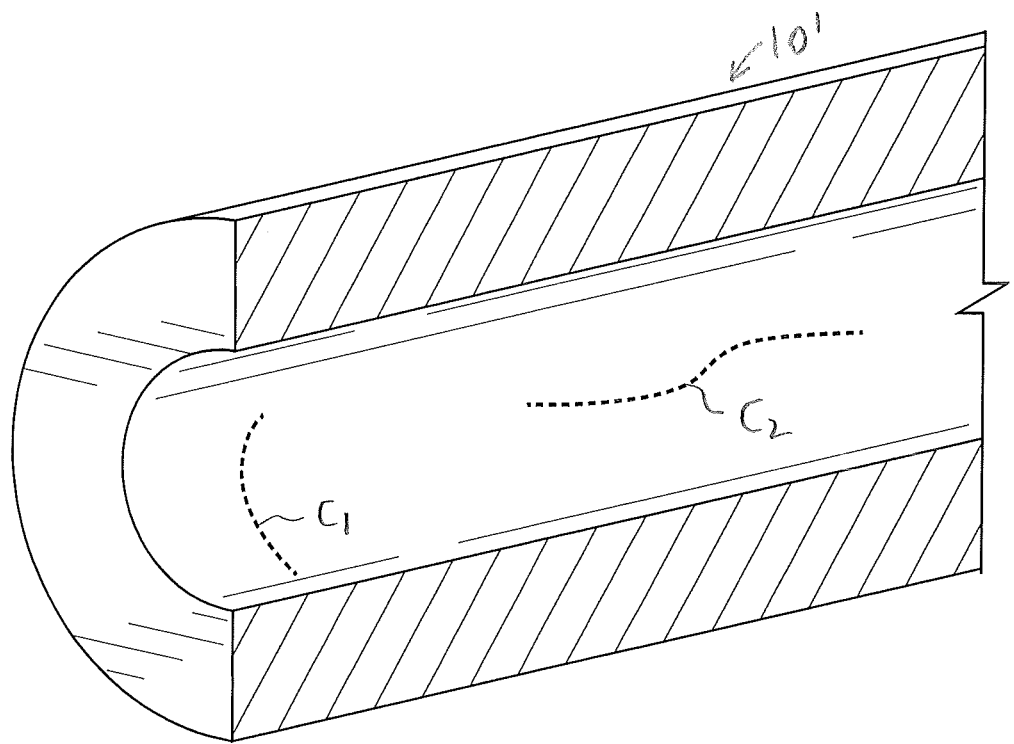
FIG. 1C (also described previously) is a partial isometric view of another metal tube of the prior art including one or more openings or cracks formed therein, drawn at a smaller scale.

In the attached drawings, like reference numerals designate corresponding elements throughout. In particular, to simplify the description, the reference numerals used in FIGS. 1A-1C are used again in connection with the description of the invention hereinafter, except that each such reference numeral is raised by 100 (or by whole number multiples thereof, as the case may be), where the elements correspond to elements illustrated in FIGS. 1A-1C.

Reference is first made to FIGS. 2A-3I to describe an embodiment of a method in accordance with the invention for at least partially filling one or more openings 112 in a workpiece 110 made of a metal. As can be seen, for instance, in FIG. 3G, the opening 112 is at least partially defined by one or more opening walls 116 having one or more opening wall surfaces 118. In one embodiment, the method preferably includes providing an insert 120 including an insert material that is metallically bondable with the metal. Those skilled in the art would also be aware of materials that are metallically bondable with each other.

As will be described, the insert 120 preferably is formed to at least partially fit into the opening 112. It is preferred that the insert 120 has one or more insert engagement surfaces 122 (FIG. 3G) that are formed for engagement with the opening wall surface(s) 118.

Preferably, the opening wall surface 118 is heated in a first non-oxidizing atmosphere to a hot working temperature. As will also be described, when the opening wall surface 118 is heated to the hot working temperature, the opening wall surface 118 is plastically deformable. It is also preferred that the insert engagement surface 122 is heated in a second non-oxidizing atmosphere to the hot working temperature. When the insert engagement surface 122 is also heated to the hot working temperature, the insert engagement surface 122 is also plastically deformable.

The hot working temperature is below the metal's melting temperature. It will be understood that the "hot working temperature", for the purposes hereof, may in fact be a range of temperatures. Those skilled in the art would be aware of suitable hot working temperatures for any particular metals, and suitable non-oxidizing atmospheres therefor.

Preferably, the insert 120 is subjected to an engagement motion, to move the insert engagement surface(s) 122 relative to the opening wall surface(s) 118. As will be described, the engagement motion may be as oscillating or vibrating motion. While the insert 120 is subjected to the engagement motion, and while the insert engagement surface 122 and the opening wall surface 118 are at the hot working temperature, the insert 120 preferably is also subjected to a translocation motion, to move the insert 120 at least partially into the opening 112, to engage the insert engagement surface(s) 122 with the opening wall surface(s) 118.

As will also be described, the insert 120 preferably is simultaneously subjected to both the engagement motion and the translocation motion, to engage the moving insert engagement surface(s) 122 with the opening wall surface(s) 118, to cause plastic deformation of the opening wall surface(s) 118 and of the insert engagement surface(s) 122 as they engage each other, for at least partially creating a metallic bond between the insert 120 and the workpiece 110. Finally, the insert 120 and the workpiece 110 are allowed to cool, to solidify the insert 120 and the workpiece 110 together.

Those skilled in the art would be aware that the opening wall surface(s) 118 and the insert engagement surface(s) 122 should be suitably prepared (e.g., cleaned) prior to their heating and subsequent engagement. Those skilled in the art would also be aware of suitable surface preparation techniques.

Figure 2A:
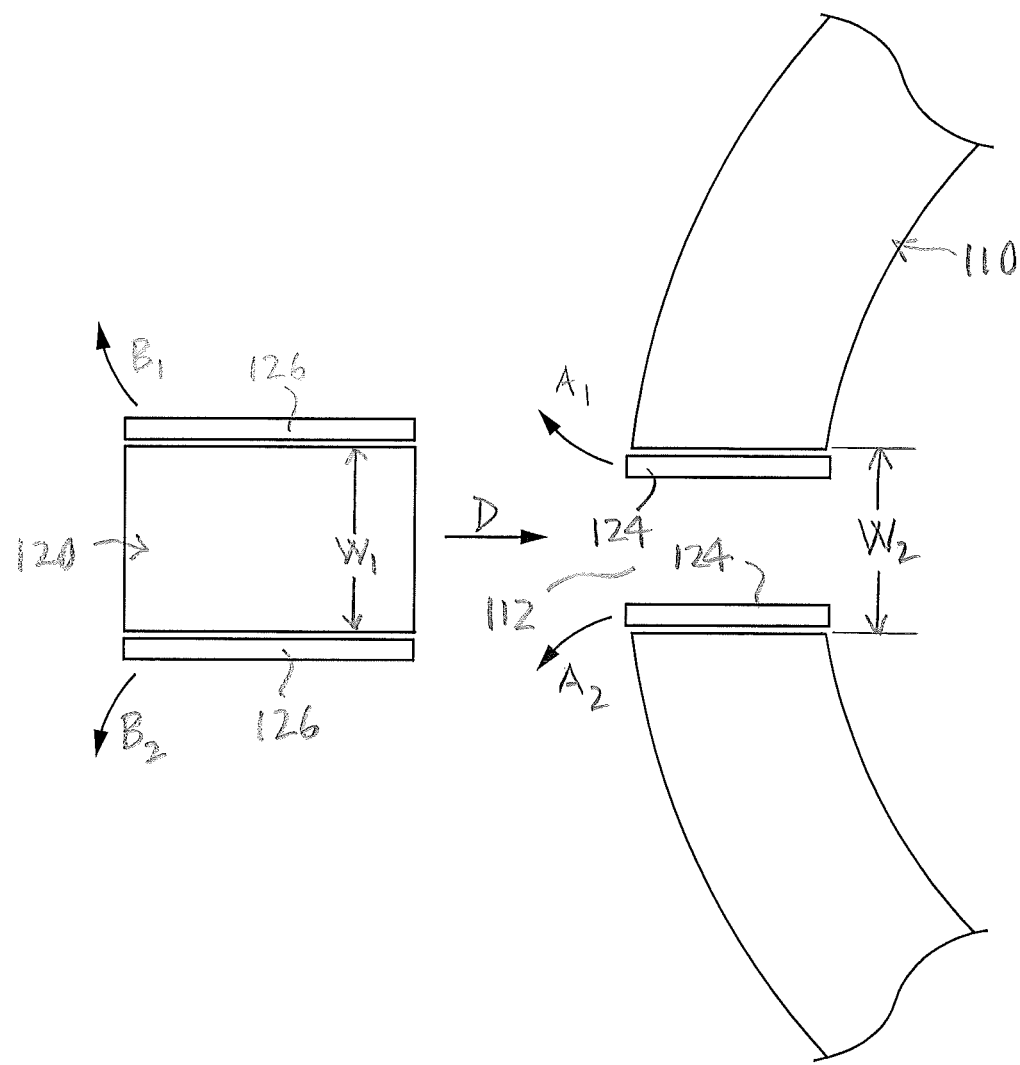
FIG. 2A is a cross-section of an embodiment of an insert of the invention and other elements prior to translocation of the insert into an opening in a metal workpiece, drawn at a larger scale.
Figure 3A:
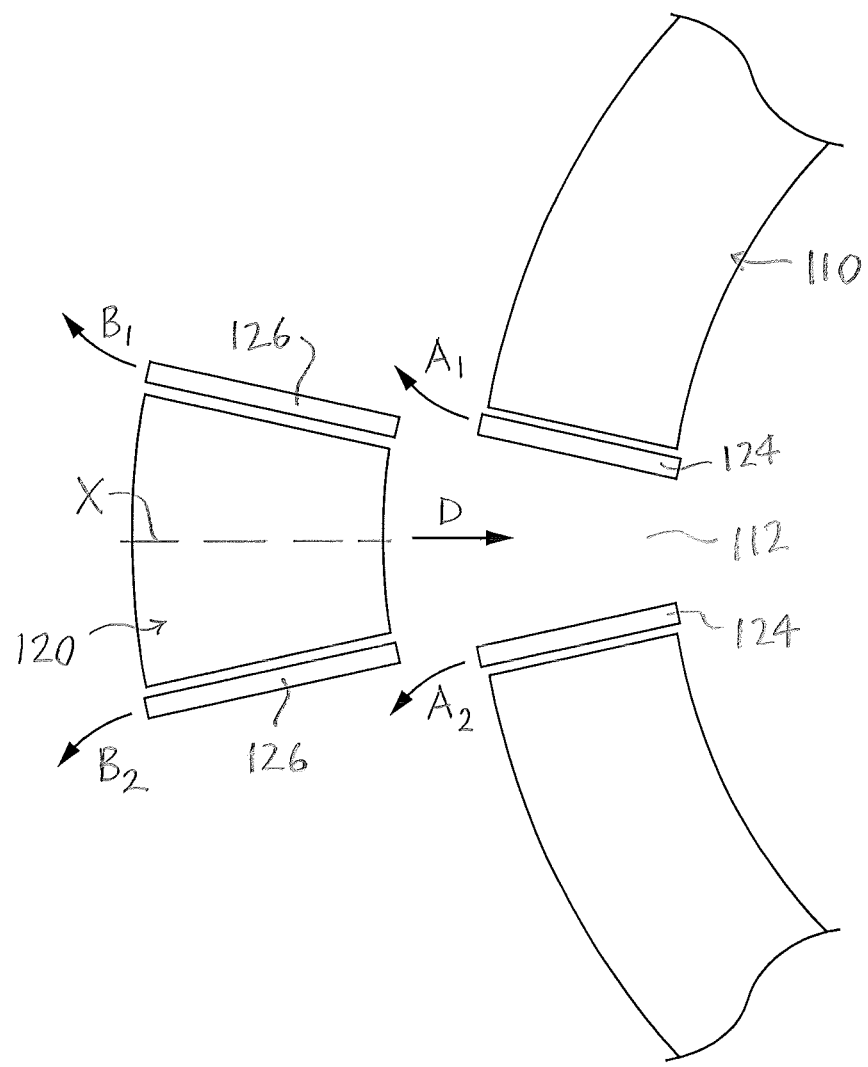
FIG. 3A is a cross-section of another embodiment of an insert of the invention prior to translocation of the insert into an opening in a metal workpiece.
Figure 3B:
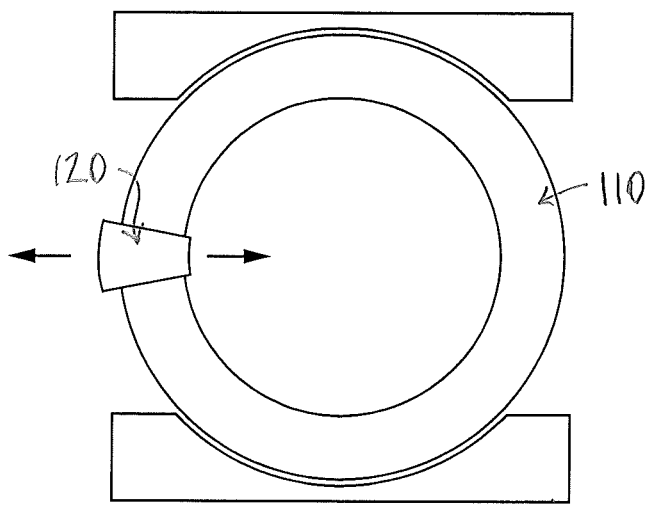
FIG. 3B is a cross-section of the metal workpiece of FIG. 3A with the insert positioned in the opening, drawn at a smaller scale.
Figure 3C:
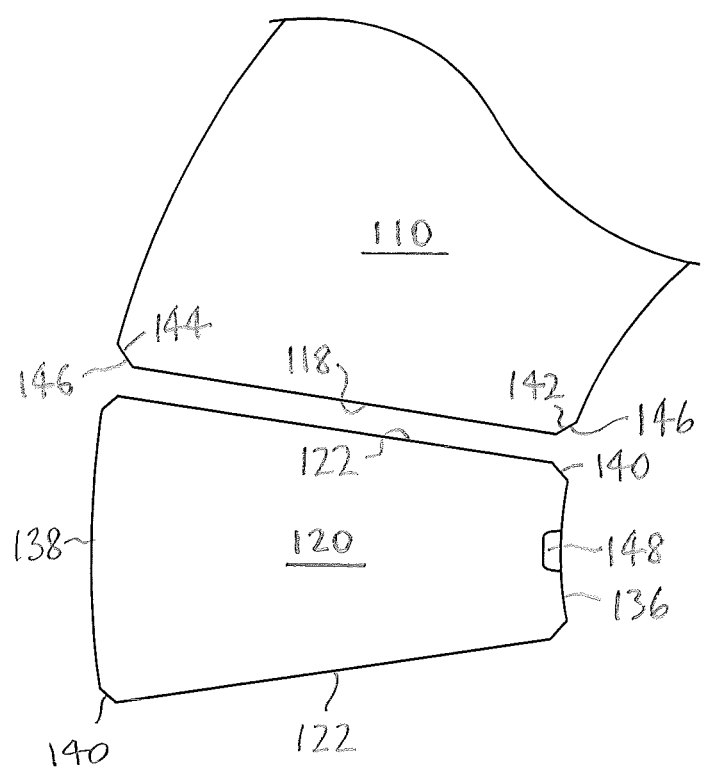
FIG. 3C is a cross-section of a metal workpiece and of another embodiment of the insert of the invention positioned in an opening in the workpiece, drawn at a larger scale.
Figure 3D:
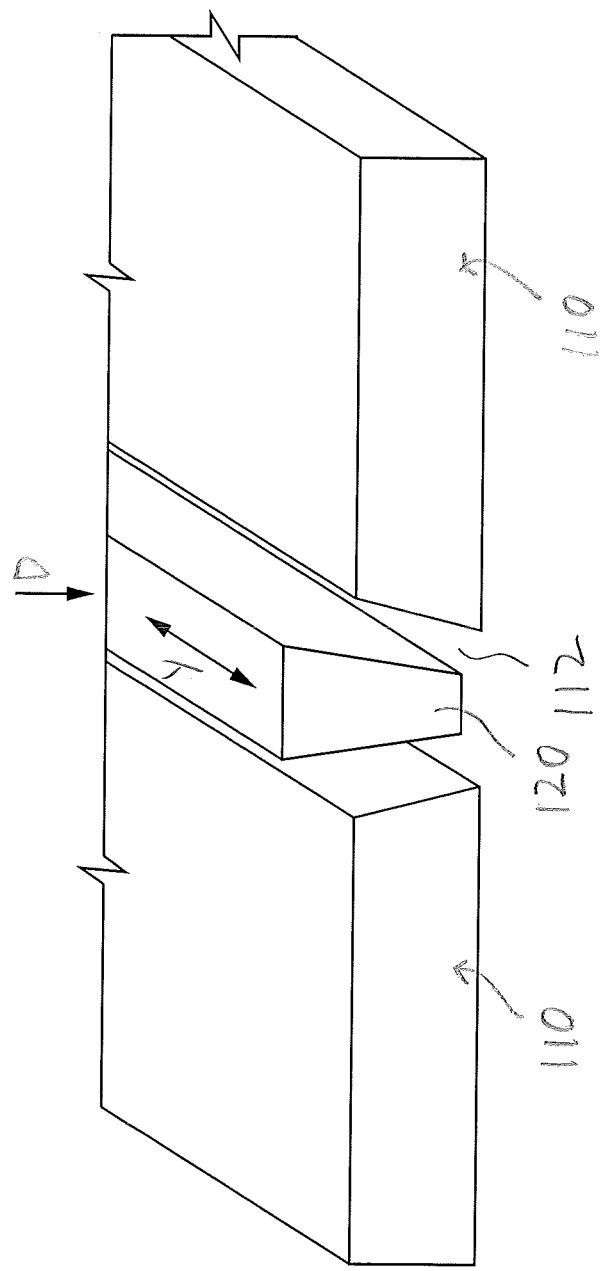
FIG. 3D is a partial isometric view of an embodiment of an insert located in an opening in a metal workpiece, drawn at a smaller scale.
Figure 3F:
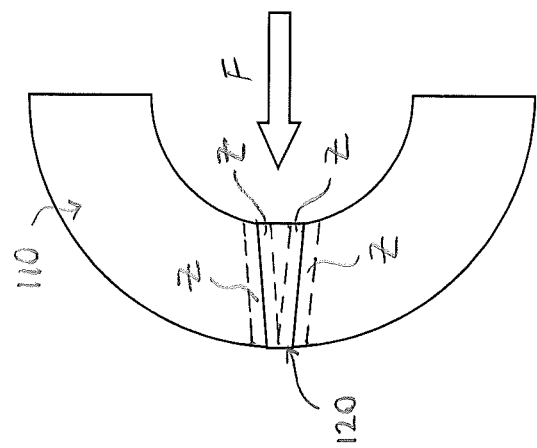
FIG. 3F is a partial cross-section of a workpiece with an embodiment of the insert of the invention positioned in an opening therein, in which the insert is translocated outwardly.
Figure 3E:
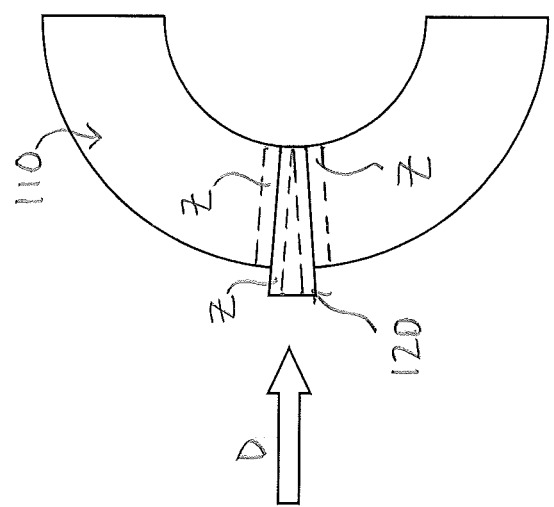
FIG. 3E is a partial cross-section of a workpiece with an embodiment of the insert positioned in an opening therein, in which the insert is translocated inwardly, drawn at a smaller scale.
Figure 3G:
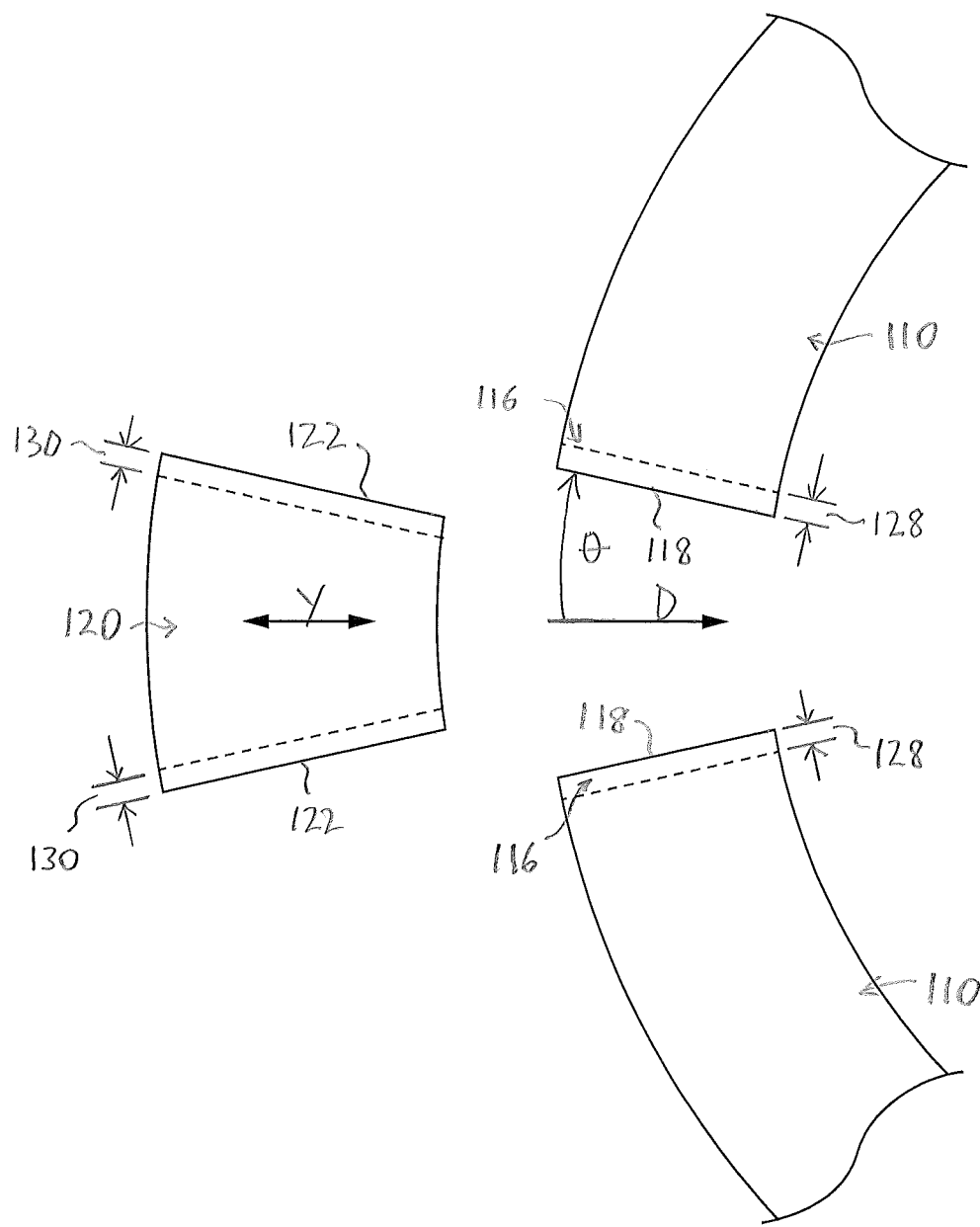
FIG. 3G is a partial cross-section of the workpiece and the insert of FIG. 3A, drawn at a larger scale.
Figure 3H:
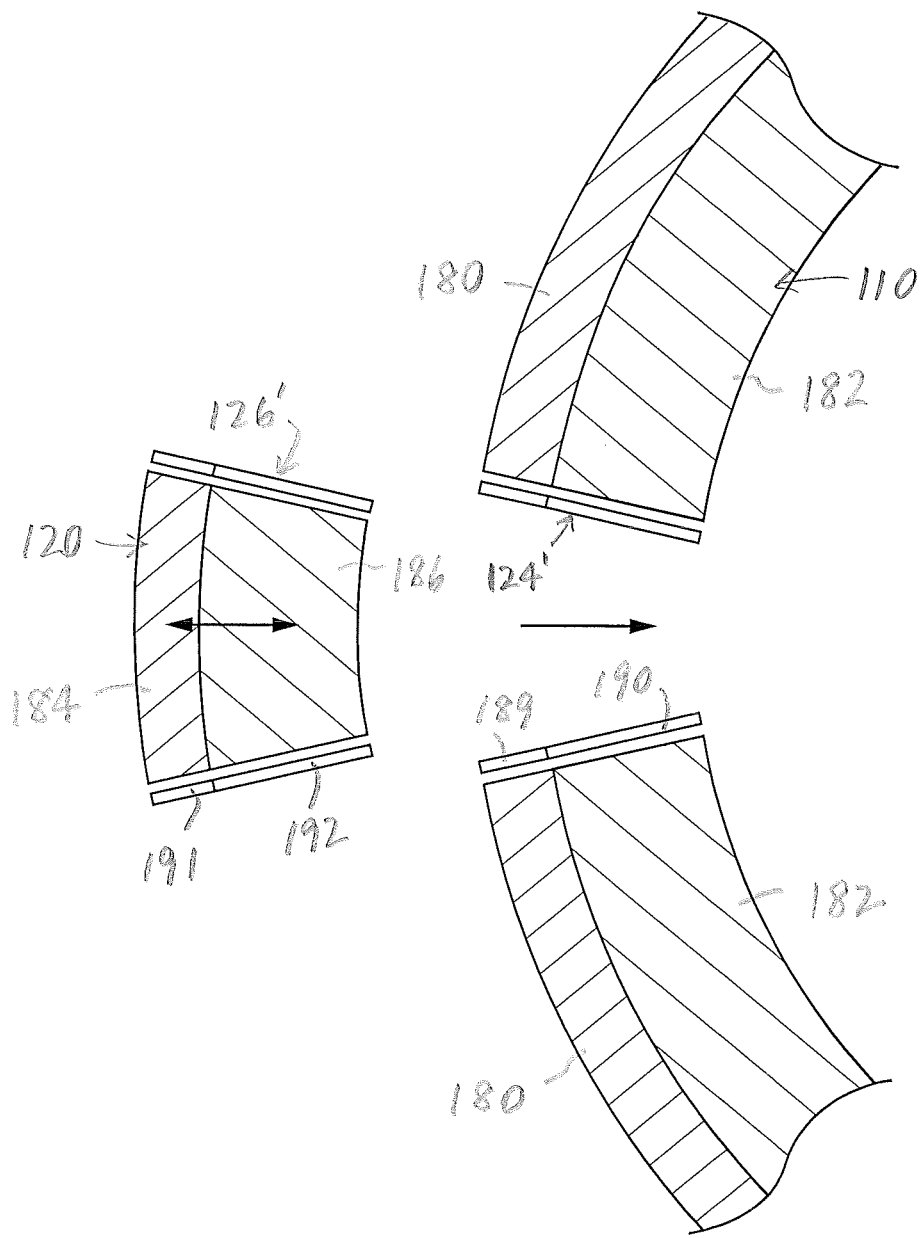
FIG. 3H is a cross-section of another workpiece with an opening therein and an alternative embodiment of an insert of the invention.

In the example illustrated in FIG. 3G, the opening 112 is at least partially defined by two opening wall surfaces 118. The opening wall surfaces 118 may be heated to the hot working temperature by any suitable means. For instance, in FIG. 2A, two opening surface heating elements 124 are shown as being located proximal to the two opening wall surfaces 118 respectively. In addition, two insert heating elements 126 are also shown in FIG. 2A, for heating the insert engagement surfaces 122 respectively to the hot working temperature.

Once the opening wall surface heating elements 124 have heated the opening wall surfaces 118 to the hot working temperature, they are removed, as indicated by arrows "$A_1$", "$A_2$" (FIGS. 2A, 3A). Also, once the insert engagement surfaces 122 have been heated to the hot working temperature, the insert heating elements 126 are removed, as indicated by arrows "$B_1$", "$B_2$" (FIGS. 2A, 3A).

The insert 120, while subjected to the engagement motion (as indicated by arrows "Y" in FIG. 3D), is moved (i.e., translocated) into the opening 118, as indicated by arrow "D" in FIGS. 3D and 3GA. As noted above, the hot working temperature is the temperature at which the insert engagement surface 122 and the opening wall surface 118 are subject to plastic deformation thereof. At the same time as the insert 120 is subjected to the engagement motion, the insert 120 is translocated to engage the workpiece 110. Upon engagement, the insert engagement surface 122 engages the opening wall surface 118. When the insert 120 engages the workpiece 110, the insert 120 is still subjected to the engagement motion, in order to plastically deform the insert engagement surface 122 and the opening wall surface 118. In a short time period immediately following the initial engagement of the insert engagement surface 122 with the opening wall surface 118, the insert 120 continues to move (i.e., is subjected to the engagement motion) relative to the workpiece 110. It will be understood that the engagement is effected with considerable force, in order to achieve metallic bonding.

The engagement of the insert engagement surface 122 with the opening wall surface 118, both of which are at the hot working temperature, results in a zone of material at the insert engagement and opening wall surfaces 122, 118 in which the insert 120 and the workpiece 110 are metallically bonded with each other. Such bonding is the result of the engagement force applied, and simultaneous engagement motion of the insert relative to the workpiece while the engaged surfaces 118, 122 are at the hot working temperature.

The method results in a workpiece and insert that are fused together to form a product in which heat-affected zones are absent. The process of the invention appears to result in a metallically bonded zone "Z" (FIGS. 3E, 3F) at which the insert and the workpiece are fused together, and in which bonded zone the metal has a uniform crystalline microstructure. As disclosed, e.g., in U.S. Pat. No. 6,637,642, the metal is heated to the temperature (the hot working temperature) at which the metal is plastically deformable. It is also believed to be important, in order to achieve a uniform crystalline microstructure in the bonded zone, that the metal not be melted during the heating and engagement steps of the process.

It will be understood that the metal of the workpiece and the metal of the insert may be any suitable materials that may be fused together by the method of the invention, e.g., alloys or metal elements, as the case may be. For instance, the metals that are fused together may include steel, aluminum, titanium, zirconium, Inconel™ and Hastelloy™. Due to the heat and shear/forging pressure that is applied, the material in the bonded zone has a uniform crystalline microstructure, which is relatively strong. For instance, it has been determined that, where the insert and the workpiece are made of steel, the steel in the bonded zone is bainitic.

The insert heating elements 126 and the opening surface heating elements 124 may be any suitable heating elements that can provide sufficient heat. Those skilled in the art would be aware of suitable heating elements. The heating elements 124, 126 preferably are configured for generally uniform heating of the opening wall surface(s) 118 and the insert engagement surface(s) 122 respectively. As can be seen, for example, in FIG. 2A, the heating elements 124, 126 preferably are removable, so that, once the surfaces 118, 122 have reached the hot working temperature, the heated insert engagement surface(s) 122 may engage the heated opening wall surface(s) 118. Preferably, the removal of the heating elements, and the subsequent engagement of the insert and the workpiece, all take place within a relatively short period of time, to minimize the extent of heat loss from the surfaces 118, 122 prior to their engagement with each other.

It is preferred that the opening wall surface 118 is uniformly heated (or substantially uniformly heated) to the hot working temperature. To achieve this uniformity, it is also preferred that the opening wall 116 is uniformly heated to the hot working temperature to a first distance 128 from the opening wall surface 118 in the opening wall 116 (FIG. 3G). Those skilled in the art would be able to determine a suitable first distance.

Preferably, the insert engagement surface 122 is also uniformly heated (or substantially uniformly heated) to the hot working temperature. To achieve this uniformity, it is also preferred that the insert 120 is uniformly heated to the hot working temperature to a second distance 130 from the insert engagement surface 122 in the insert 120 (FIG. 3G). Those skilled in the art would be able to determine a suitable second distance.

As described above, the engagement motion of the insert 120 is intended to continue when, and after, the insert engagement surface 122 engages the opening wall engagement surface 118, to cause plastic deformation of each of the hot insert engagement surface 122 and the hot opening wall surface 118. It is believed that, due to the engagement motion and the force exerted to engage the insert with the workpiece, the materials of the insert engagement surface 122 and the opening wall surface 118 are commingled or mixed together, to a very small extent. To achieve this, the engagement motion continues for a short time after the surfaces 118, 122 engage each other. The engagement motion may be any suitable motion. For example, any repetitive motion of the insert 120 relative to the workpiece 110 may be suitable. For instance, in one embodiment, the engagement motion preferably is an oscillating motion relative to the workpiece 110.

As an example, as can be seen in FIG. 3D, the insert's engagement motion may be longitudinal (i.e., back and forth), along an elongate opening 112, as the insert is moved into the opening 112 by the translocation motion. As noted above, the longitudinal engagement motion preferably continues for a short time period after the initial engagement of the insert with the opening wall, i.e., until the insert and the workpiece become bonded together. Another example of engagement motion is illustrated in FIG. 3G, in which the insert 120 is moved axially (i.e., back and forth, aligned with the direction of translocation) as the insert 120 is moved into the opening by the translocation motion (indicated by arrow "D"). It will be understood that, in this example also, the engagement motion preferably continues for a short time period after the initial engagement of the insert with the opening wall, i.e., until the insert and the workpiece become bonded together.

Alternatively, in another embodiment, the oscillating motion preferably is a linear motion of the insert, in which the insert is moved linearly relative to the workpiece, e.g., in any suitable direction. The oscillating motion may alternatively describe any suitable pattern, e.g., an arc or a partial ellipse.

In another alternative embodiment, the engagement motion preferably is a rotation of the insert 120 relative to the workpiece 110, e.g., about an axis "X" of the insert 120 (FIG. 3A). Alternatively, the engagement motion may be a vibrating motion relative to the workpiece.

As can be seen, e.g., in FIG. 3D, in one embodiment, the insert 120 preferably is subjected to an engagement motion in which the insert 120 is moved longitudinally along the opening 112, as indicated by arrow "G" in FIG. 3D. The arrow "G" is double-ended to indicate an oscillating longitudinal motion. In this example, the direction of the translocation motion is orthogonal (or substantially orthogonal) to the back-and-forth directions of the engagement motion.

In one embodiment, the opening wall surface 118 preferably is planar, and it is preferred that the insert engagement surface 122 also is planar (FIG. 3G). It will be understood that the opening wall engagement surface 118 and the insert engagement wall surface 122 preferably are formed to engage each other when the insert 120 is at least partially inserted into the opening 112. Preferably, the insert engagement surface 122 and the opening wall surface 118 are formed to cooperate with each other to locate the insert 120 at least partially in the opening 112 so that the respective areas of the surfaces are substantially engageable with each other.

As illustrated in FIGS. 2A, 3A, 3E, 3F, and 3G, it is preferred that the translocation motion is in a predetermined linear direction into the opening 112. As examples, the direction of the translocation motion is indicated by arrow "D" in FIGS. 2A, 3A, 3E, 3F, and 3G. Preferably, the opening wall surface 118 is located at a predetermined angle Θ relative to the predetermined linear direction of the translocation motion (FIG. 3G). The predetermined angle may be any suitable angle. For instance, in FIG. 3G, the angle Θ defined by the opening wall surfaces 118 relative to the insert's direction of translocation motion is approximately 15°.

Figure 2B:
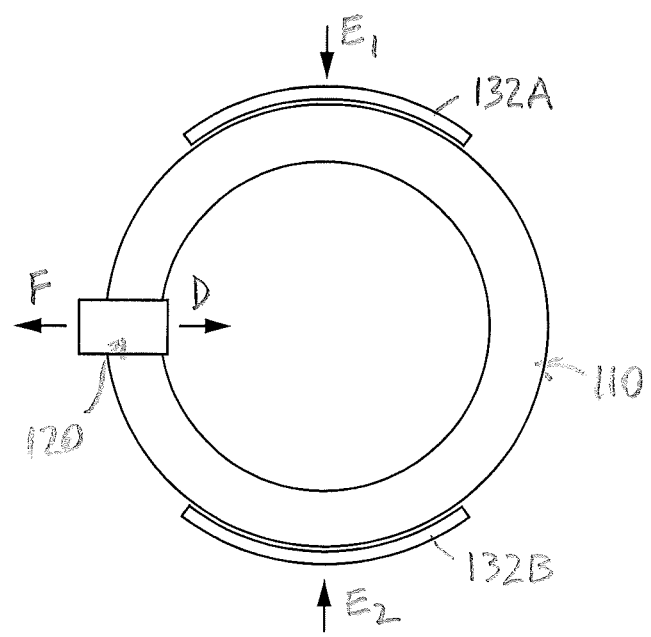
FIG. 2B is a cross-section of the metal workpiece of FIG. 2A with the insert positioned in the opening, drawn at a smaller scale.
Figure 2C:
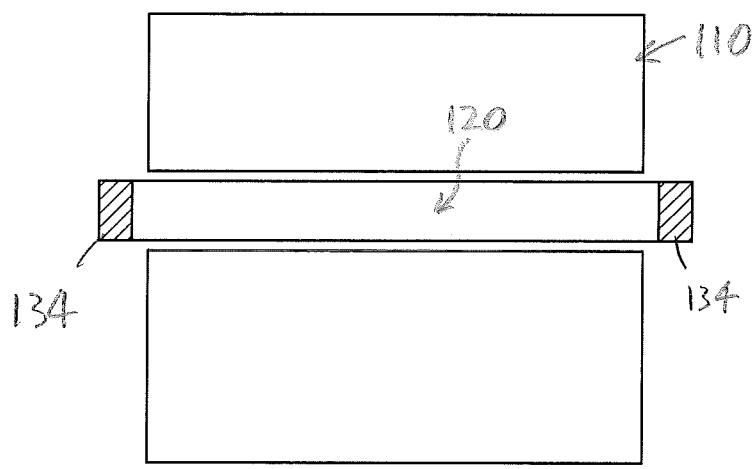
FIG. 2C is a cross-section of the metal workpiece of FIGS. 2A and 2B with the insert positioned in the opening, drawn at a larger scale.

Those skilled in the art would appreciate that, in FIGS. 2A-2C, the opening wall surfaces 118 preferably are substantially parallel with the insert engagement surfaces 122 that are to be engaged therewith. It will be understood that in the embodiment illustrated in FIGS. 2A-2D, the insert 120 preferably is slightly wider than the opening 112. That is, the width "$W_1$" of the insert 120 identified in FIG. 2A preferably is slightly wider than the width "$W_2$" of the opening 112, when the surfaces are heated to the hot working temperature.

As can be seen, e.g., in FIG. 2B, in one embodiment, one or more clamps 132A, 132B preferably exert inwardly-directed pressure (schematically represented by arrows "$E_1$", "$E_2$") onto the workpiece 110, to maintain the shape of the workpiece, and to hold the workpiece stationary.

As can also be seen, e.g., in FIGS. 2A, 2B, 3A, 3B, 3F, and 3G, the translocation motion preferably is in the predetermined linear direction, into the opening 112. As illustrated in FIGS. 2B, 3B, 3F, and 3G, the translocation movement of the insert 120 may be, for example, inwardly (as indicated by arrow "D"), or outwardly (as indicated by arrow "F").

Once the insert 120 is positioned at least partially in the opening 112 and the insert has bonded with the workpiece, one or more portions 134 thereof may extend beyond the opening wall surface(s) 118 of the workpiece that the insert 120 has bonded with (FIG. 2C). In this situation, the portions 134 may be cut off or otherwise removed, using any suitable means.

It will be understood that, during the engagement of the insert engagement surface 122 and the opening wall surface 118, a small portion of the material that is plastically deformed may be extruded from the insert and/or the workpiece, along an exposed part of the insert and/or the workpiece at the surfaces 118, 122. Depending on the specifications that the bonded or fused insert and the workpiece are required to meet, the extruded material, once cooled, may be required to be removed. In practice, however, such removal may be difficult, and time-consuming.

Those skilled in the art would appreciate that the insert 120 may have any suitable configuration. In one embodiment, illustrated in FIG. 3C, the insert 120 preferably extends between an inner end 136 and an outer end 138 thereof, and the insert 120 preferably also includes one or more chamfered insert surfaces 140 located proximal to the insert engagement surfaces 122, at one or more of the inner and outer ends 136, 138. The chamfered insert surfaces 140 preferably are formed in order to minimize the amount of extruded material that may extend beyond the insert 120 and/or the workpiece 110 at inner and/or outer sides of the insert, once the insert and the workpiece are bonded together.

As can also be seen in FIG. 3C, each of the opening wall surfaces 118 preferably extends between an internal end 142 and an external end 144. It is preferred that the workpiece 110 includes one or more chamfered workpiece surfaces 146 located proximal to the opening wall surface(s) 118 at one or more of the internal and external ends 142, 144. The chamfered workpiece surfaces 146 preferably are formed in order to minimize the amount of extruded material that may extend beyond the insert 120 and/or the workpiece 110 at inner and/or outer sides of the insert.

The chamfered surfaces 140, 146 define spaces into which any plastically deformed material that is squeezed out as the insert is engaged with the workpiece may enter, so that such material is not extruded into the interior of the tube workpiece, or alternatively, not extruded onto the exterior surface of the tube workpiece.

In one embodiment, it is preferred that the insert 120 includes one or more notches 148 formed at the inner end 136, to minimize the amount of extruded material that may protrude into the interior of the tube workpiece.

Figure 2D:
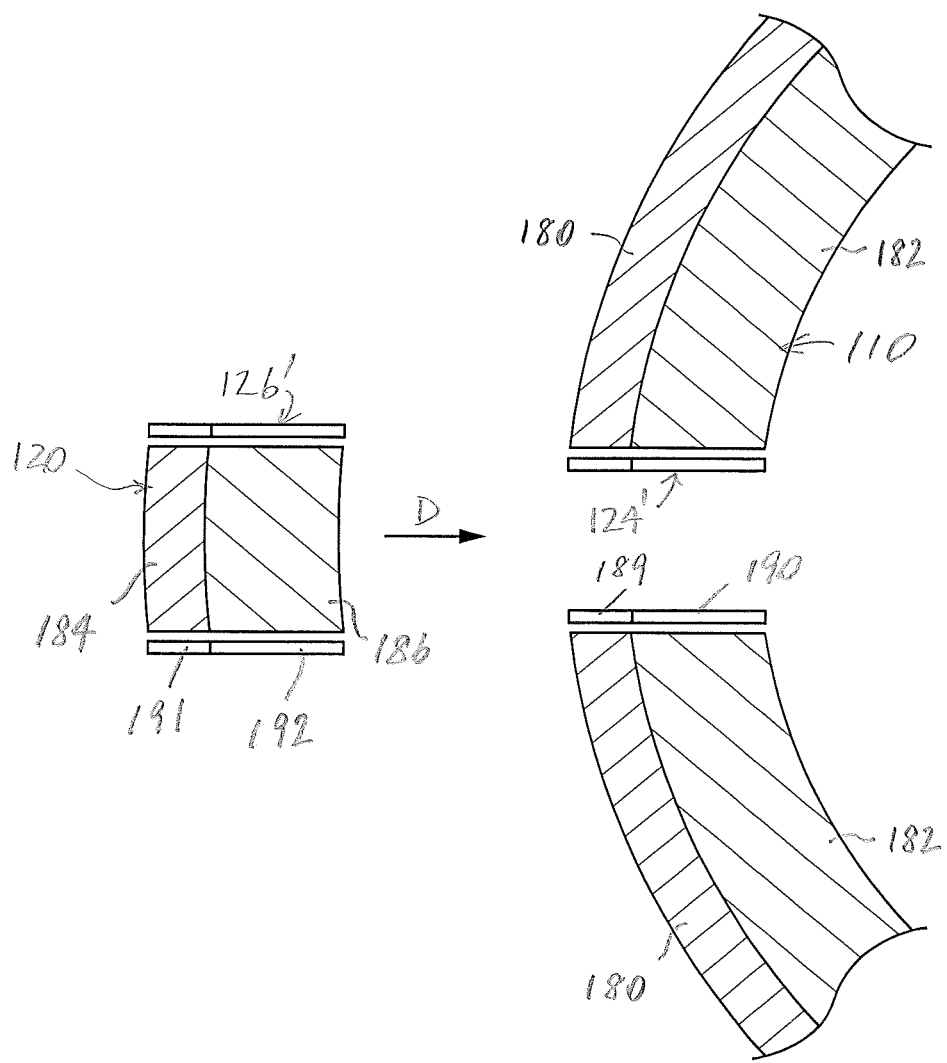
FIG. 2D is a cross-section of another workpiece with an opening therein and an alternative embodiment of an insert of the invention, drawn at a larger scale.
Figure 2E:
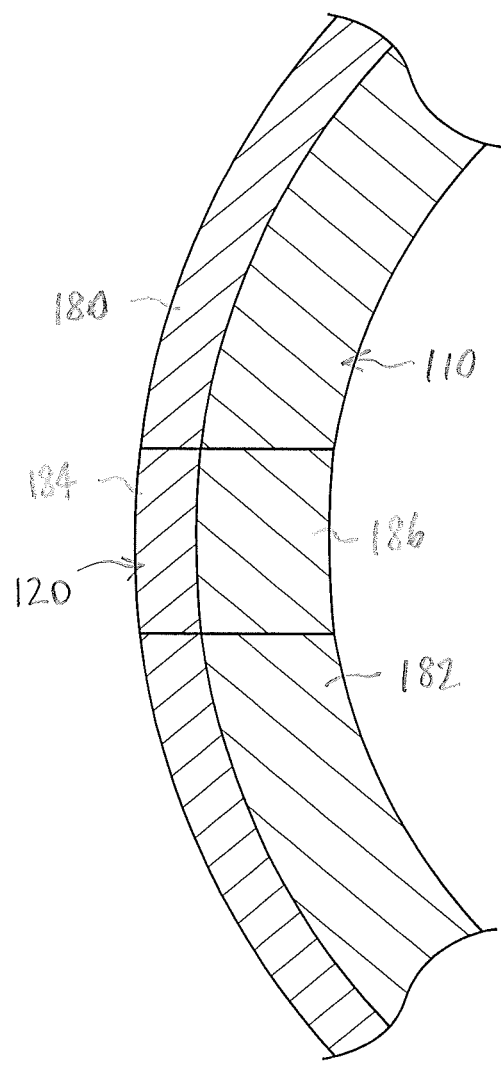
FIG. 2E is a cross-section of the workpiece of FIG. 2D, with the insert of FIG. 2D located in the opening.
Figure 3I:
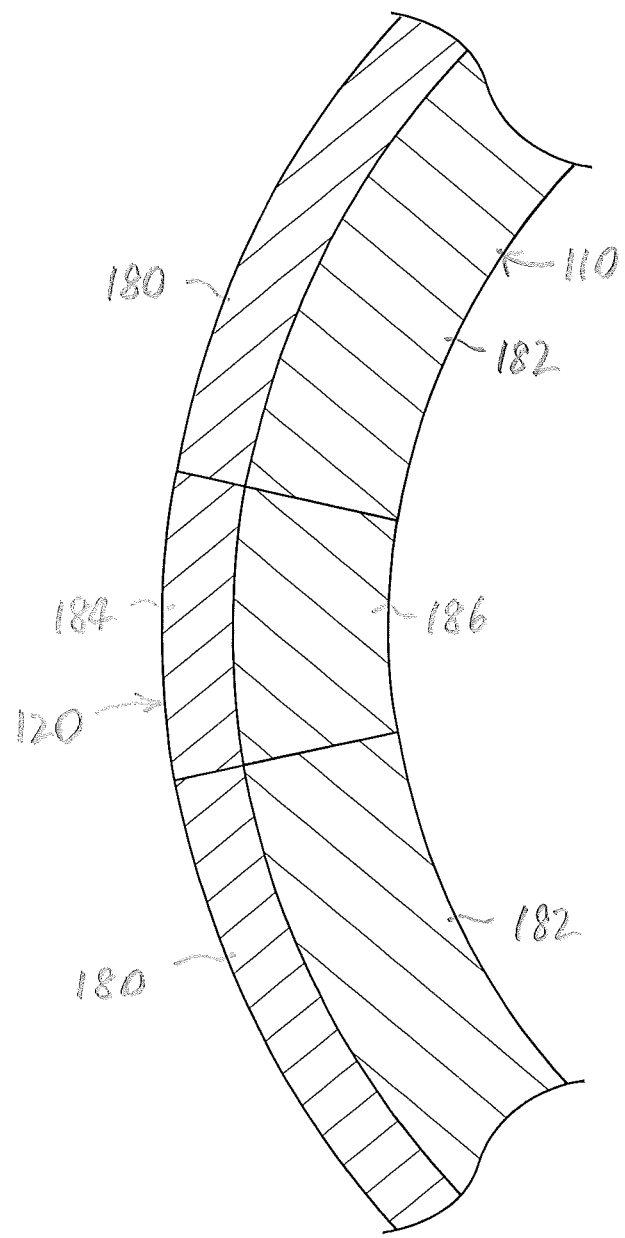
FIG. 3I is a cross-section of the workpiece of FIG. 3H, with the insert of FIG. 3H located in the opening.

The workpiece 110 may include two or more layers of respective metals. For example, as illustrated in FIGS. 2D and 3I, the workpiece 110 may include a first layer 180 of a first metal, and a second layer 182 of a second metal. It will be understood that, to form the workpiece 110, the layers 180, 182 may be fused together using any suitable method.

Where the workpiece 110 includes two or more layers of respective metals, it is preferred that the insert 120 also includes layers 184, 186 to fuse or bond with the layers 180, 182 respectively. When the insert 120 is at least partially located in the opening, the layers 184, 186 are metallically bondable with the layers 180, 182 respectively (FIGS. 2E, 3J). For instance, as illustrated in FIGS. 2D and 2E, and in FIGS. 3I and 3J, in one embodiment, the insert 120 preferably includes the layers 184, 186 of steel and copper respectively. It is also preferred that the layers 184, 186 are formed so that, when the insert 120 is at least partially located in the opening 112, the layers 184, 186 are substantially aligned with the corresponding layers 180, 182 of steel and copper respectively in the workpiece 110.

Heating elements 124', 126' preferably are used to heat the opening wall surface 118 and the insert engagement surface 122 respectively. The heating elements 124' preferably include first and second parts 189, 190 for heating the first and second layers 180, 182 respectively. Also, the heating elements 126' preferably include first and second parts 191, 192 for heating the layers 184, 186 of the insert 120 respectively.

Figure 4A:
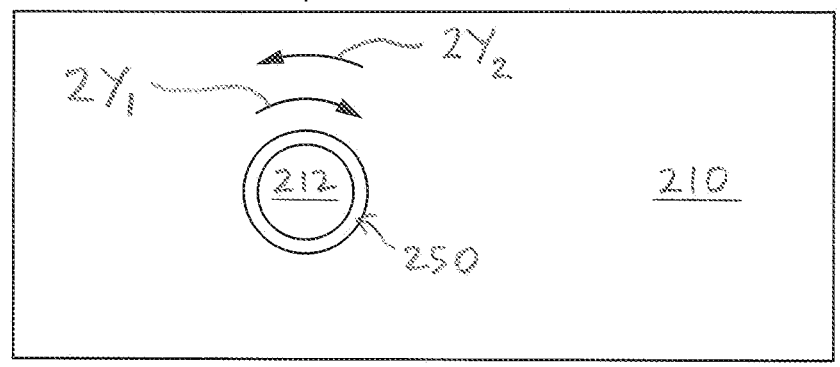
FIG. 4A is a top view of a workpiece with an embodiment of a tube insert of the invention positioned thereon, drawn at a smaller scale.
Figure 4B:
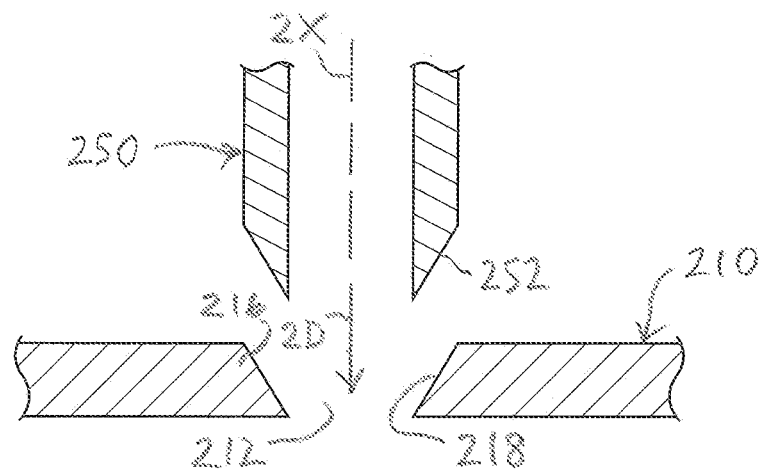
FIG. 4B is a cross-section of the workpiece and the tube insert of FIG. 4A, prior to translocation of the tube insert toward the workpiece, drawn at a larger scale.
Figure 4C:
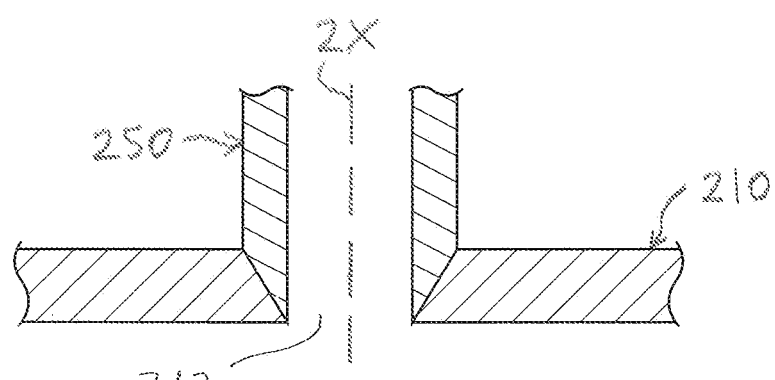
FIG. 4C is a cross-section of the workpiece and the tube insert of FIGS. 4A and 4B in which the tube insert is bonded with the workpiece.

In an alternative embodiment illustrated in FIGS. 4A-4C, the method of the invention is for at least partially attaching a tube 250 to a workpiece 210 made of a metal, to at least partially align the tube 250 with one or more openings 212 in the workpiece 210. The tube 250 is also made of a metal that is bondable with the metal of the workpiece 210 (i.e., preferably the same metal). The opening 212 is at least partially defined by one or more opening walls 216 having one or more opening wall surfaces 218 (FIG. 4B). The method preferably includes forming one or more tube engagement surfaces 252 on the tube 250 that are configured for engagement with the opening wall surface(s) 218. Preferably, the opening wall surface 218 is heated in a first non-oxidizing atmosphere to a hot working temperature, at which the opening wall surface 218 is plastically deformable. It is also preferred that the tube engagement surface 252 is heated in a second non-oxidizing atmosphere to the hot working temperature, at which the tube engagement surface 252 is plastically deformable. Next, the tube 250 preferably is subjected to an engagement motion, to move the tube engagement surface 252 relative to the opening wall surface 218.

The engagement motion may be any suitable motion. For example, the engagement motion may be a regularly repeated motion (e.g., an oscillation) or an irregularly repeated motion.

It will be understood that heating elements and clamps are omitted from FIGS. 4A-5B to simplify the illustrations. It will also be understood that the non-oxidizing atmosphere is held inside a covering or container that is also omitted from FIGS. 4A-5B.

In one embodiment, while the tube 250 is subjected to the engagement motion, and while the tube engagement surface 252 and the opening wall surface 218 are at the hot working temperature, the tube 250 preferably is also subjected to a translocation motion to move the tube 250 at least partially into the opening 212, for engaging the tube engagement surface 252 with the opening wall surface 218 while the tube is subjected to the engagement motion. As described above, this causes plastic deformation of the opening wall surface 218, and plastic deformation of the tube engagement surface 252 also as they engage each other, for at least partially creating a metallic bond between the tube 250 and the workpiece 210. Finally, the tube 250 and the workpiece 210 are allowed to cool, to solidify the tube 250 and the workpiece 210 together.

As can be seen in FIGS. 4A-4C, the workpiece 210 may be, for example, a flat sheet of metal, e.g., steel. In FIG. 4B, the tube 250 and the workpiece 210 are shown shortly before engagement of the tube 250 and the workpiece 210. It will be understood that the heating elements and other elements needed to implement the method of the invention (e.g., clamps) are omitted from FIG. 4B for clarity of illustration.

The engagement motion may be, for example, a repeated or oscillating rotational motion of the tube 250 about its axis "2X", as indicated by arrows "$2Y_1$" and "$2Y_2$" in FIG. 4A. The translocation motion is in the direction indicated by arrow "2D" in FIG. 4B. The translocation motion preferably is coaxial with the axis "2X".

In FIG. 4B, it can be seen that, in one embodiment, the tube engagement surface 252 preferably is planar, and positioned at a selected angle relative to the direction of the translocation motion. Also, the opening wall surface 218 preferably is planar, and positioned at the selected angle relative to the direction of the translocation motion.

As described above, while the tube 250 is subjected to the engagement motion, it is preferably simultaneously moved in the direction indicated by arrow "2D", to engage the tube engagement surface 252 with the opening wall surface 218. Preferably, after the tube engagement surface 252 initially engages the opening wall surface 218, the tube 250 is still moving in accordance with the engagement motion. At that point in the process, the tube 250 continues to be pressed against the workpiece 210 in the direction indicated by arrow "2D", while the insert 250 is subject to the engagement motion. This results in the plastic deformation of the tube engagement surface 252 and the opening wall surface 218, resulting in the tube 250 fusing with the workpiece 210, as described above.

Those skilled in the art would appreciate that the tube 250 and the workpiece 210 rapidly cool after initial engagement, and the engagement motion ceases shortly after the initial engagement because the tube 250 and the workpiece 210 rapidly bond together, preventing further engagement motion.

Figure 5A:
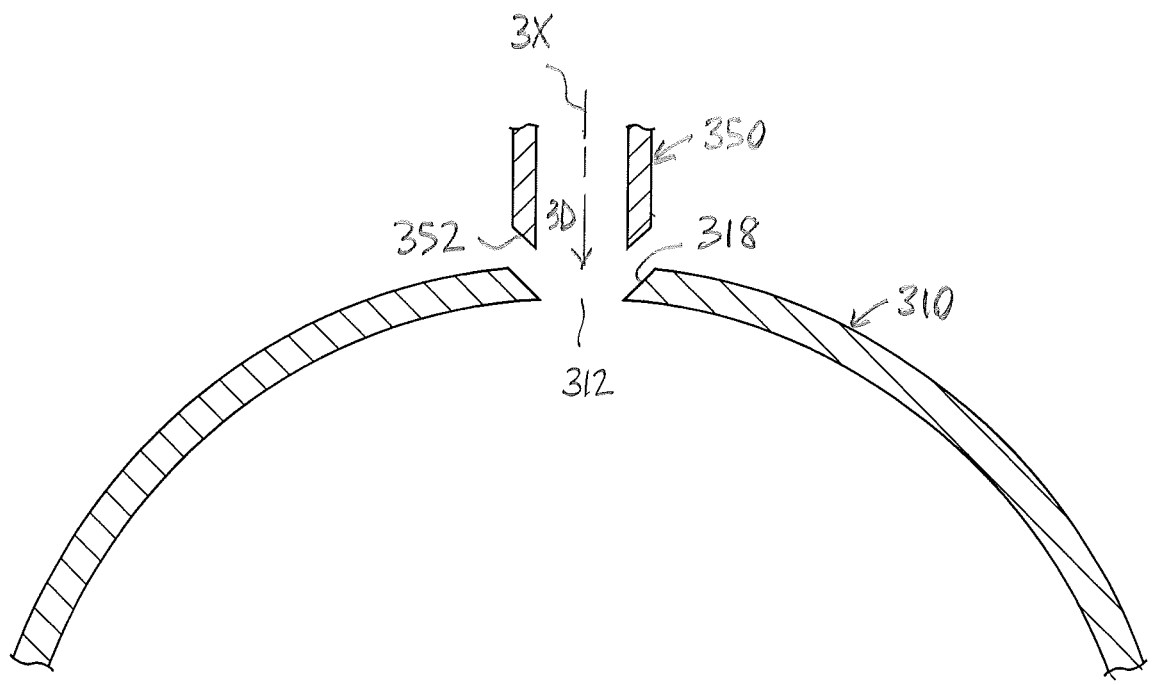
FIG. 5A is a cross-section of another embodiment of the insert of the invention and a metal workpiece prior to translocation of the tube insert toward the workpiece.
Figure 5B:
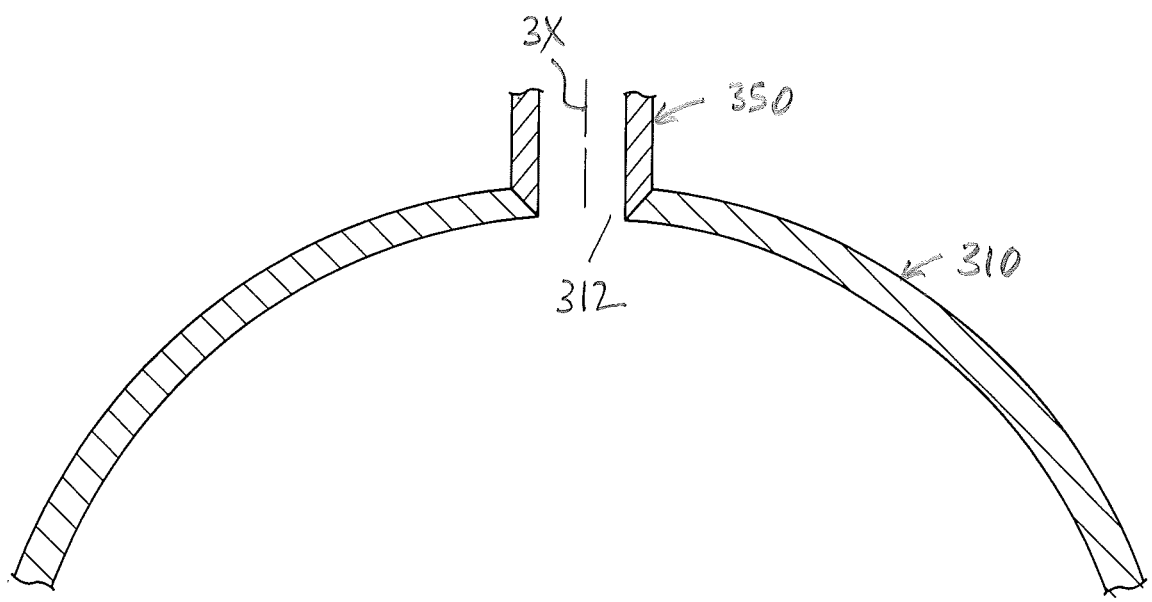
FIG. 5B is a cross-section of the metal workpiece of FIG. 5A with the tube insert bonded therewith.

In FIGS. 5A and 5B, a tube 350 is shown being bonded with a workpiece 310. The tube 350 defines an axis "3X" thereof. The tube 350 is aligned with an opening 312. In FIG. 5A, the tube engagement surface 352 and the opening wall surface 318 can be seen, prior to their engagement. It will be understood that the heating elements and other elements (e.g., clamps) needed to implement the method of the invention are omitted from FIG. 5A for clarity of illustration. It will also be understood that the tube 350 is subjected to the engagement motion while the tube engagement surface 352 and the opening wall surface 318 are both heated, in one or more non-oxidizing atmospheres, to the hot working temperature. The engagement motion may be, for example, an oscillating rotational motion of the tube 350 about its axis "3X". The tube 350 is then moved in the translocation motion direction (indicated by arrow "3D"), while still subjected to the engagement motion.

The tube engagement surface 352 and the opening wall surface 318 are subjected to plastic deformation upon their engagement and shortly thereafter, to form a metallic bond between the tube 350 and the workpiece 310.

The workpiece 310 may be, for example, a body of a manifold, and the tube 350 may be one of several tubes (not shown) secured to the body, to form the manifold.

Figure 8B:
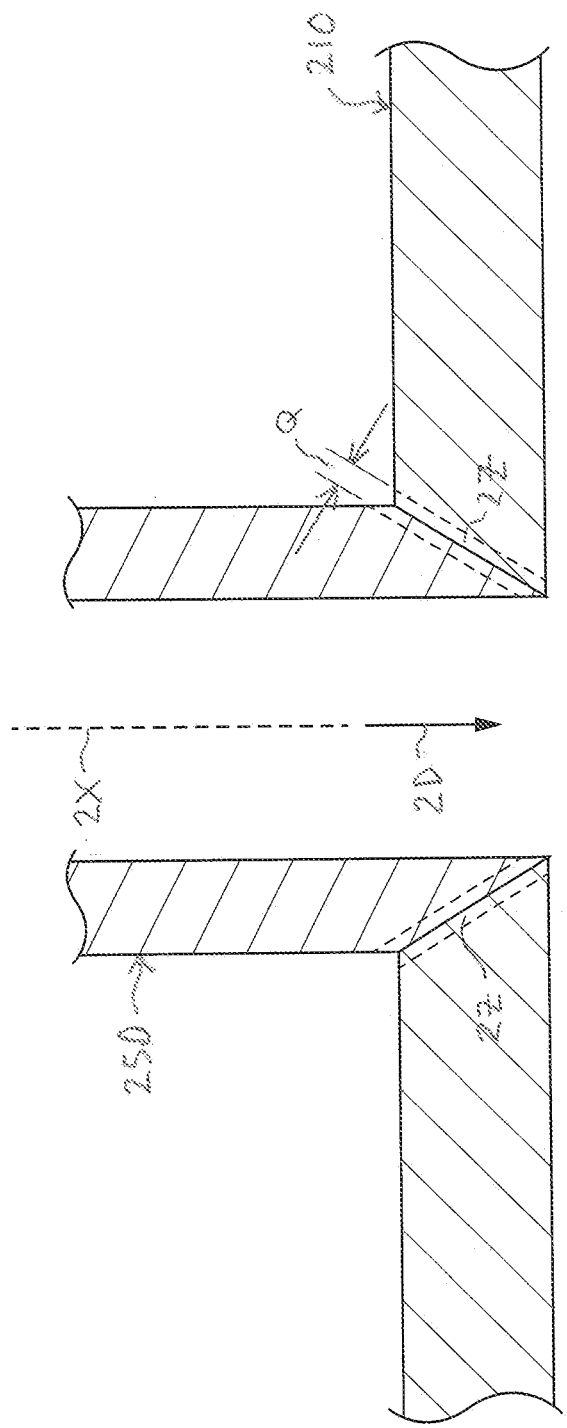
FIG. 8B is the cross-section of the tube and the workpiece of FIG. 4C, drawn at a larger scale.

In another embodiment illustrated in FIGS. 4A-4C and 8A-8B, the method of the invention is for attaching the metal tube 250 (which has a tube wall 251 defining a tube channel 253 therein, as can be seen in FIG. 8A) to the metal workpiece 210 having the workpiece wall 216. In one embodiment, the method preferably includes forming the workpiece opening 212 in the workpiece wall 216. The workpiece opening 212 is at least partially defined by the workpiece opening wall surface 218 in the workpiece wall 216 (FIGS. 4B, 8A).

The tube engagement surface 252 preferably is formed on the tube wall 251 for engagement with the workpiece opening wall surface 218. Next, one or more heating elements 224 (FIG. 8A) are positioned in predetermined positions relative to the workpiece opening wall surface 218 and the tube engagement surface 252. In the embodiment illustrated in FIG. 8A, two heating elements 224 are shown, as an example (i.e., one heating element is positioned to heat the workpiece heated portion 255, and the second heating element is positioned to heat the tube heated portion 257). Those skilled in the art would appreciate that the heating elements 224 may have any suitable configuration, and may be positioned relative to the tube engagement surface 252 and relative to the workpiece opening wall surface 218 in any suitable position or arrangement. The heating elements may be provided in any suitable number. It will be understood that only two heating elements are shown in FIG. 8A for clarity of illustration.

The heating elements 224 (FIG. 8A) are energized in a non-oxidizing atmosphere. It will also be understood that the non-oxidizing atmosphere preferably is held in a suitable cover or container that is omitted from FIGS. 4A-5B and 8A-8D for clarity of illustration.

With the energized heating elements 224, in the non-oxidizing atmosphere, a workpiece heated portion 255 (FIG. 8A) that extends into the workpiece wall 216 from the workpiece opening wall surface 218 preferably is heated to a hot working temperature, at which the workpiece heated portion 255 is at least partially plastically deformable.

With the energized heating element 224, in the non-oxidizing atmosphere, a tube heated portion 257 (FIG. 8A) that extends into the tube wall 251 from the tube engagement surface 252 preferably is heated to the hot working temperature, at which the tube heated portion 257 is at least partially plastically deformable.

It will be understood that the heating elements are omitted from FIGS. 4B and 5A for clarity of illustration. Also, the heated portions of the workpiece 210 and the tube 250 are omitted from FIGS. 4B and 5A for clarity of illustration.

As can be seen in FIG. 8A, the predetermined position of each of the heating elements 224, relative to the workpiece opening wall surface 218 and the tube engagement surface 252, is the position at which the energized heating elements 224 may heat the workpiece heated portion 255 and the tube heated portion 257 respectively to the hot working temperature, when energized.

Those skilled in the art would appreciate that, preferably, each of the heated portions 255, 257 is heated so that they are substantially uniformly heated to the hot working temperature. The heating elements 224 preferably are selected and configured to achieve uniform heating of the heated portions 255, 257. The heating elements 224 may be any heating elements that are suitable for the purpose. It is preferred that the heating elements 224 heat the heated portions 255, 257 by induction.

In one embodiment, while the workpiece heated portion 255 and the tube heated portion 257 are at the hot working temperature, the tube 250 preferably is subjected to an engagement motion, to move the tube engagement surface 252 relative to the workpiece opening wall surface 218. In addition, while the tube 250 is subjected to the engagement motion, and while the workpiece heated portion 255 and the tube heated portion 257 are at the hot working temperature, the tube 250 preferably is subjected to a translocation motion, to push the tube engagement surface 252 toward, and against, the workpiece opening wall surface 218 while the tube 250 is subjected to the engagement motion.

After the tube engagement surface 252 engages the workpiece opening wall surface 218, the engagement motion continues, until the tube and the workpiece are fused together.

As noted above, the engagement motion may be any suitable motion. As can be seen in FIG. 8A, the engagement motion may be, for example, an oscillation of the tube 250 about its axis "2X", or a rotation of the tube 250 about the axis "2X". Rotation of the tube 250 about its axis "2X" is indicated, for example, by arrow "H" in FIG. 8A.

Next, while the tube 250 is subjected to the engagement motion, and while the tube heated portion 255 and the workpiece heated portion 257 are at the hot working temperature, the tube engagement surface 252 preferably is pressed against the workpiece opening wall surface 218, to cause plastic deformation of the workpiece heated portion 255 and of the tube heated portion 257 as they engage each other, for creating a metallic bond between the tube 250 and the workpiece 210. It is also preferred that the tube 250 and the workpiece 210 are then allowed to cool, to bond the tube 250 and the workpiece 210 together.

In FIG. 8A, the translocation motion of the tube 250 toward the workpiece 210 is indicated by arrow "2D". It will be understood that, after the tube engagement surface 252 first engages the workpiece opening wall surface 218, the tube engagement surface 252 is pressed against the workpiece opening wall surface 218 in the direction indicated by arrow "2D" in FIG. 8B. It will also be understood that the engagement motion of the tube continues while the tube engagement surface 252 is pressed against the workpiece opening wall surface 218, until the tube 250 and the workpiece 210 are fused or bonded together.

As noted above, the heated portions 255, 257 preferably are heated, by induction, to the hot working temperature, at which the metal in the heated portions is plastically deformable. Preferably, the heating elements 224 are controlled so that the temperature of the heated portions 255, 257 is kept below the melting temperature of the metal. The temperature is kept below the melting temperature so that heat-affected zones do not develop in the tube 250 or in the workpiece 210. Those skilled in the art would be aware of a melting temperature, and of a suitable hot working temperature, of the metal.

It will be understood that the pressure exerted to press the tube engagement surface 252 against the workpiece opening wall surface 218, while the heated portions are at the hot working temperature, and while the tube is subjected to the engagement motion, is relatively low. However, some pressure is needed, in order to subject the heated portions 255, 257 to shearing.

As noted above, the method of the invention results in a metallically bonded zone at which the tube 250 and the workpiece 210 are fused together, in the absence of any heat affected zones. Due to the engagement motion continuing while the tube engagement surface 252 is pressed against the workpiece opening wall surface 218, the material in the heated portions 255, 257 is subjected to a shearing action, in which the microstructure therein that is at or adjacent to the surfaces 252, 218 is sheared, resulting in a substantially uniform microstructure extending throughout the fused zone. The bonded or fused zone, in which the metal has a uniform crystalline microstructure, is believed to be generally the heated portions 255, 257, in which the metal was not melted. In FIG. 8B, the fused zone is identified by the reference character "2Z".

In practice, the heated portions 255, 257 and the fused zone "2Z" are relatively thin. The fused zone "2Z" as shown in FIG. 8B has a width "Q". It will be understood that the thicknesses of the heated portions 255, 257 and the fused zone "2Z", as illustrated in FIGS. 8A and 8B, are exaggerated, for clarity of illustration.

As noted above, the engagement motion may be any suitable motion. In one embodiment, for example, the engagement motion of the tube preferably is an oscillation about the axis "2X" of the tube.

Figures 8C, 8D:
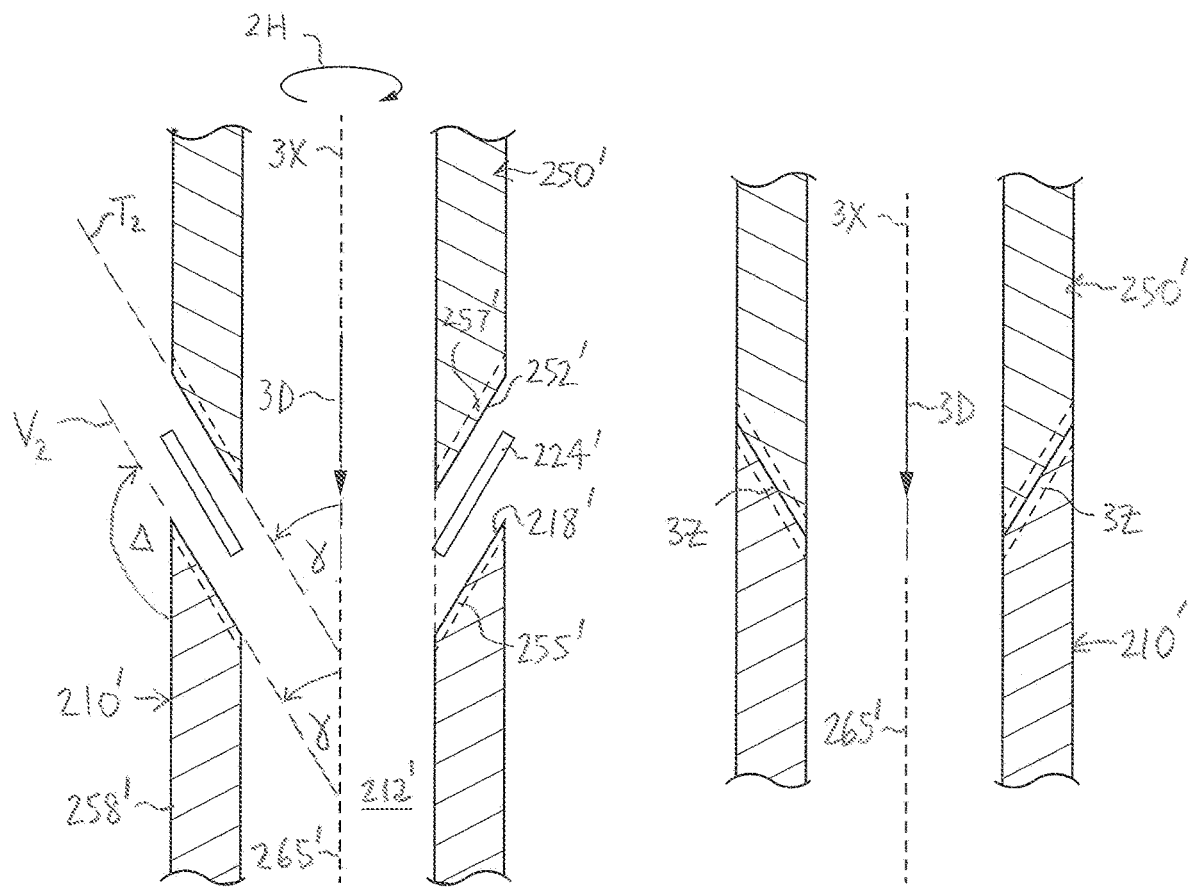
FIG. 8C is a cross-section of a workpiece and an embodiment of a tube.
FIG. 8D is a cross-section of the workpiece and the tube of FIG. 8C in which the tube is bonded with the workpiece.

Preferably, the tube engagement surface 252 and the workpiece opening wall surface 218 are formed to mate with each other (FIGS. 4B, 8A, 8C). In one embodiment, for example, the tube engagement surface 252 is planar, and the workpiece opening wall surface 218 is planar. Preferably, the tube engagement surface 252 defines a tube engagement surface plane "T$_1$" that is located at an acute angle α relative to the tube axis "2X". It is also preferred that the workpiece opening wall surface 218 defines a workpiece engagement plane "V$_1$" that is located at the acute angle α relative to a workpiece opening axis 265 (FIG. 8A). The workpiece opening axis 265 is defined by the workpiece opening 212. The workpiece engagement plane "V$_1$" also defines an angle β between the workpiece engagement plane "V$_1$" and an outer surface 258 of the workpiece 210.

Preferably, the workpiece 210 and the tube 250 are positioned to align their respective axes "2X", 265.

In one embodiment, as can be seen in FIGS. 4B, 4C, 8A, and 8B, the first and second angles α, β preferably are complementary. That is, once the tube 250 and the workpiece 210 are fused together, the tube 250 is positioned orthogonally to the axes of the tube 250 and the workpiece 210.

In another alternative embodiment, illustrated in FIGS. 8C and 8D, the first and second angles preferably are supplementary, rather than complementary. An embodiment in which the first and second angles are supplementary is illustrated in FIGS. 8C and 8D. For clarity, the first and second angles in FIGS. 8C and 8D are identified by reference characters γ and Δ.

As can be seen in FIGS. 8C and 8D, the tube 250' defines a tube axis "3X", and the workpiece opening 212' defines a workpiece opening axis 265'. Preferably, the tube 250' includes a tube engagement surface 252' that is planar, and defines a tube engagement surface plane "T$_2$" that is located at a first (acute) angle γ relative to the tube axis "3X". The workpiece 210' preferably also includes a workpiece opening wall surface 216' that is planar, and defines a workpiece engagement plane surface "V$_2$" that is located at a second (obtuse) angle Δ relative to the outer surface 258' of the workpiece 210'.

Preferably, heating elements 224' are positioned proximal to the tube engagement surface 252' and proximal to the workpiece opening wall surface 218', for heating heated portions 255', 257' of the workpiece 210' and the tube 250'.

As can be seen in FIGS. 8C and 8D, the sum of the angles γ and Δ is 180°. As can be seen in FIGS. 8C and 8D, in one embodiment, the tube 250' preferably is subjected to an engagement motion (e.g., rotation or oscillation about its axis "3X"), while the heated portions 255', 257' are both at the hot working temperature. The engagement motion is schematically indicated by arrow "2H" in FIG. 8C.

Preferably, while the heated portions 255', 257' are at the hot working temperature, and while the tube 250' is subjected to the engagement motion, the tube 250' is also subjected to the translocation motion, i.e., the tube 250' preferably is moved toward the workpiece 210', and after engagement, the tube engagement surface 252' is pushed against the workpiece opening wall surface 218'. In addition, the tube 250' continues to be subjected to the engagement motion while the tube engagement surface 252' is pushed against the workpiece opening wall surface 218', as indicated by arrow "3D" (FIGS. 8C, 8D). Those skilled in the art would appreciate that, while the tube engagement surface 252' is pushing against the workpiece opening wall surface 218', the temperature of the heated portions 255', 257' decreases, although plastic deformation of the heated portions 255', 257' simultaneously occurs, subjecting the heated portions 255', 257' to shear.

Accordingly, the engagement of the tube engagement surface 252' with the workpiece opening wall surface 218' while the tube 250' is subjected to the engagement motion, while the heated portions 255', 257' are at the hot working temperature, causes shearing of the microstructure in the heated portions 255', 257', resulting in the heated portions 255', 257' becoming metallically bonded together. The heated portions 255', 257' cool relatively rapidly after engagement, and once the heated portions 255', 257' are bonded or fused together to form a fused zone "3Z" (FIG. 8D), the engagement motion ceases.

As can be seen in FIG. 8D, the sum of the angles γ and Δ is 180°, once the tube 250' and the workpiece 218' are fused together.

In another alternative embodiment of the invention, the tube 250 preferably is subjected to the translocation motion, and the tube engagement surface 252 is pushed or pressed against the workpiece opening wall surface 218, while the heated portions 255, 257 are at the hot working temperature, but before the tube 250 is subjected to an engagement motion.

In this embodiment, while the workpiece heated portion 255 and the tube heated portion 257 are at the hot working temperature, and while the tube engagement surface 252 is pressed against the workpiece opening wall surface 218, the tube 250 preferably is subjected to an engagement motion in which the tube engagement surface 252 is moved relative to the workpiece opening wall surface 218, to cause plastic deformation of the workpiece heated portion 255 and of the tube heated portion 257, for creating a metallic bond between the tube 250 and the workpiece 210. The tube 250 and the workpiece 210 are then allowed to cool, to bond the tube 250 and the workpiece 210 together.

As noted above, the engagement motion may be any suitable motion, e.g., rotation or oscillation of the tube 250 about the tube axis "2X".

In another alternative embodiment, the workpiece 210 preferably is subjected to the translocation motion, and the workpiece opening wall surface 218 preferably is pressed against the tube engagement surface 252 while the heated portions 255, 257 are at the hot working temperature, and before the tube 250 is subjected to the engagement motion.

Preferably, while the workpiece heated portion 255 and the tube heated portion 257 are at the hot working temperature, and while the workpiece opening wall surface 218 is pressed against the tube engagement surface 252, the tube 250 is subjected to an engagement motion in which the tube engagement surface 252 is moved relative to the workpiece opening wall surface 218, to cause plastic deformation of the workpiece heated portion 255 and of the tube heated portion 257, for creating a metallic bond between the tube 250 and the workpiece 210. The tube 250 and the workpiece 210 are then allowed to cool, to bond the tube 250 and the workpiece 210 together.

It will be understood that the engagement motion may be any suitable motion, e.g., rotation or oscillation of the tube 250 about the tube axis "2X".

In yet another alternative embodiment of the method of the invention, it is preferred that the workpiece 210 is subjected to an engagement motion, while the heated portions 255, 257 are at the hot working temperature, and before the tube 250 is subjected to a translocation motion.

While the workpiece 210 is subjected to the engagement motion, and while the tube heated portion 257 and the workpiece heated portion 255 are at the hot working temperature, the tube engagement surface 252 preferably is pressed against the workpiece opening wall surface 218, to cause plastic deformation of the workpiece heated portion 255 and of the tube heated portion 257, for creating a metallic bond between the tube 250 and the workpiece 210. The tube 250 and the workpiece 210 are allowed to cool, to bond the tube 250 and the workpiece 210 together.

Figure 9A:
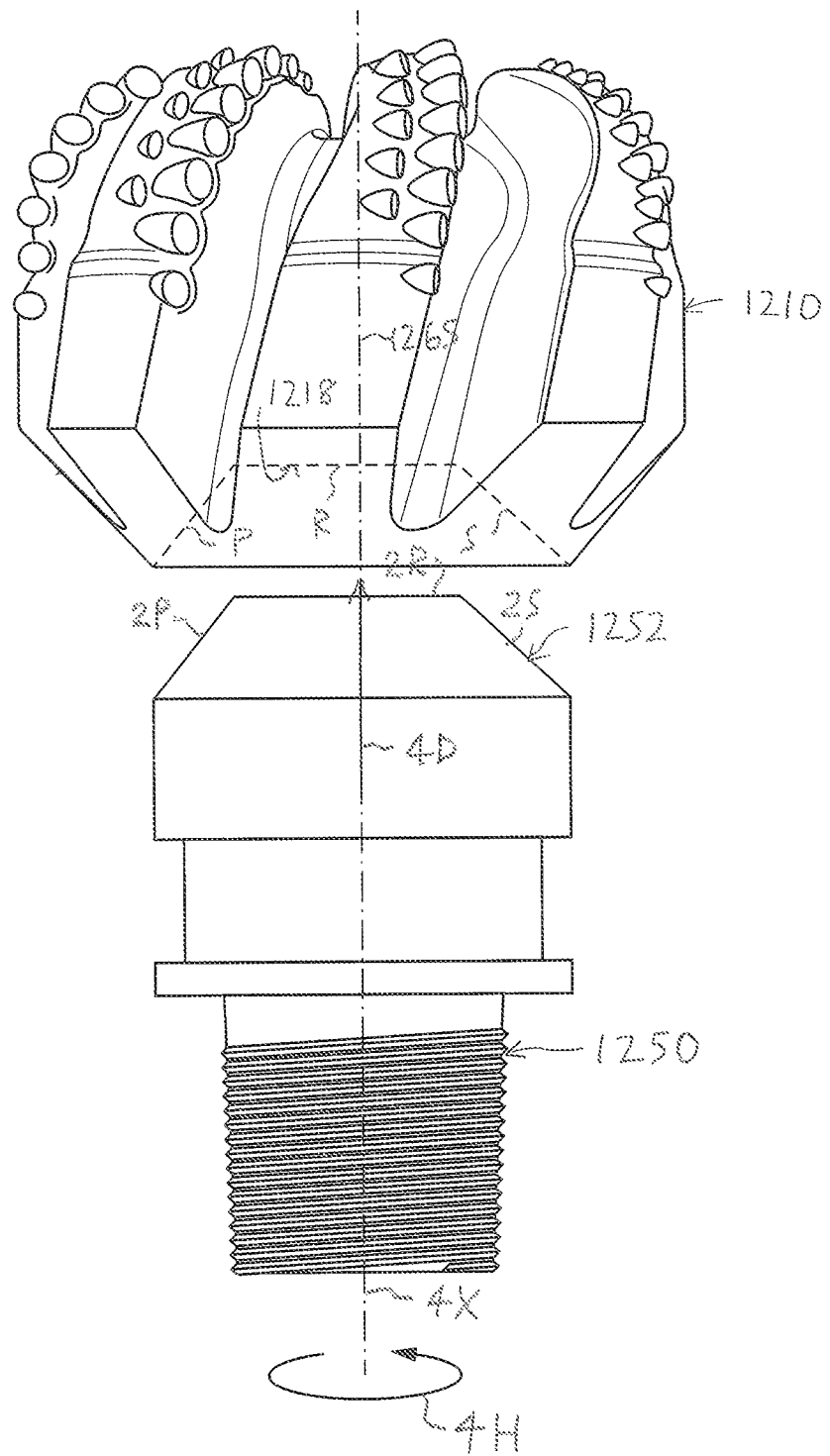
FIG. 9A is a side view of a tube and another workpiece, to be fused together, drawn at a smaller scale.

In one embodiment, a tube 1250 preferably includes one or more tube engagement surfaces 1252 that are positioned at respective predetermined angles relative to the tube axis "4X" of the tube 1250 (FIG. 9A). Preferably, the one or more tube engagement surfaces 1252 of the tube 1250 are formed to mate with one or more workpiece opening wall surfaces 1218 formed on a workpiece 1210. Preferably, the respective tube engagement surfaces 1252 and the respective workpiece engagement surfaces 1218 are planar.

It will be understood that the tube and the workpiece may be in any suitable form or configuration. For instance, in the example illustrated in FIGS. 9A and 9B, the workpiece 1210 is a body of a rotary drill bit, and the tube 1250 includes a shank portion of the rotary drill bit, to be attached to the body.

Figure 9B:
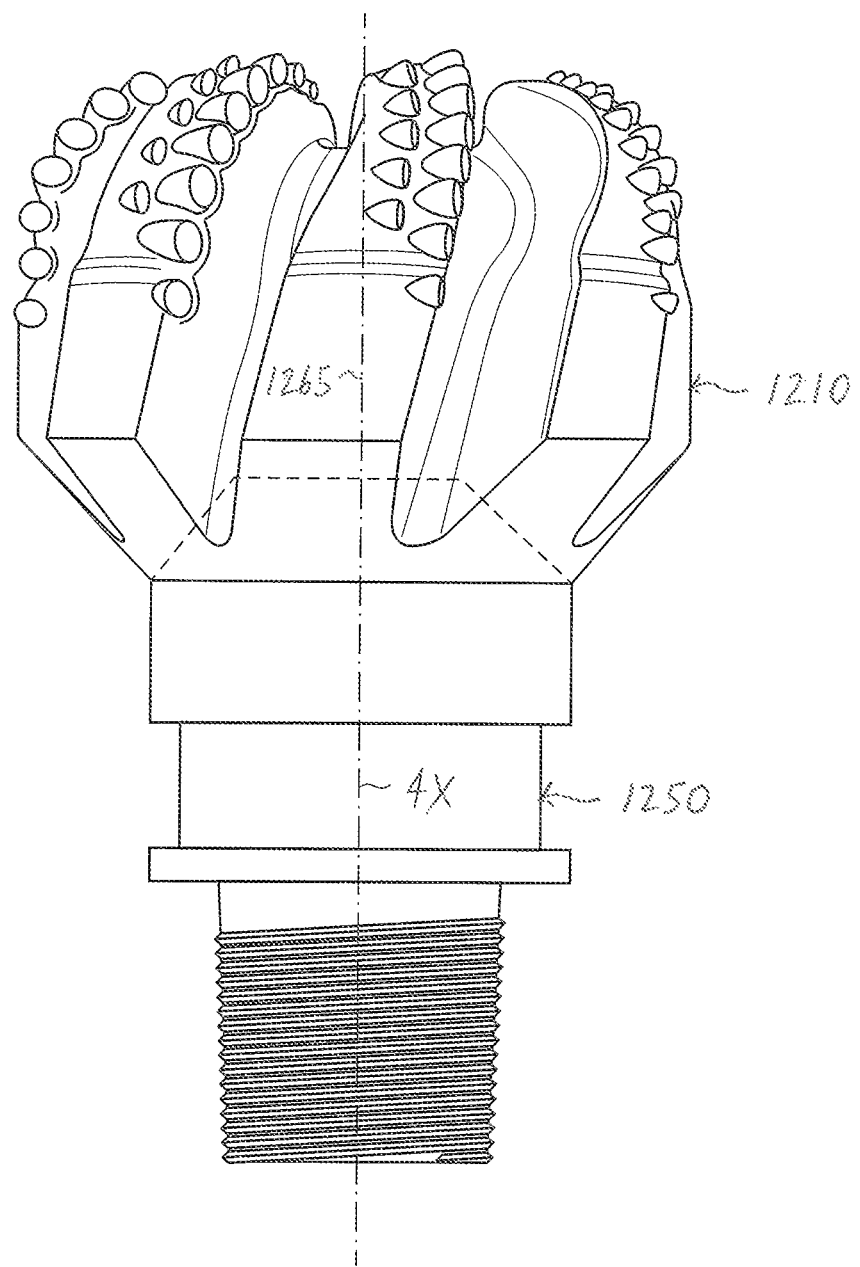
FIG. 9B is a side view of the tube and the workpiece of FIG. 9A, fused together.

In the example illustrated in FIGS. 9A and 9B, the workpiece 1210 has three different workpiece opening wall surfaces 1218, individually identified in FIG. 9A for clarity by reference characters "P", "R", and "S". The corresponding tube engagement surfaces 1252 are individually identified in FIG. 9A by reference characters "2P", "2R", and "2S" respectively, for convenience. The tube engagement surfaces "2P", "2R", and "2S" are formed to fit with or mate with the workpiece engagement surfaces "P", "R", and "S" respectively. It will be understood that the surfaces as illustrated in FIGS. 9A and 9B are exemplary only, and the workpiece engagement surfaces and the corresponding tube engagement surfaces may have any suitable configuration.

Heating elements (not shown in FIG. 9A) preferably are positioned to heat respective heated portions 1255, 1257 of the workpiece 1210 and the tube 1252, in a non-oxidizing atmosphere, to the hot working temperature. (It will be understood that the heating elements and a container or containing device for the non-oxidizing atmosphere are omitted from FIG. 9A for clarity of illustration.)

In one embodiment, while the heated portions 1255, 1257 are at the hot working temperature, the tube 1250 preferably is subjected to an engagement motion, to move the tube engagement surfaces 1252 relative to the workpiece opening wall surfaces 1218. As described above, the engagement motion may be any suitable motion. For example, the tube 1250 may be rotated or oscillated about the axis "4X", as indicated by arrow "4H" in FIG. 9A.

While the tube 1250 is subjected to the engagement motion, and while the heated portions 1255, 1257 are at the hot working temperature, the tube 1250 is subjected to a translocation motion, moving the tube 1250 toward the workpiece 1210, i.e., in the direction indicated by arrow "4D" (FIG. 9A).

When the tube engagement surfaces 1252 engage the respective workpiece opening wall surfaces 1218, they are pressed against the workpiece opening wall surfaces 1218, while the tube engagement surfaces 1252 continue to be subjected to the engagement motion, and also while the heated portions 1255, 1257 are at the hot working temperature.

Also as described above, the heated portions 1255, 1257 are plastically deformed as a result. The heated portions 1255, 1257 lose heat once the heating elements are removed, and after the heated portions have been plastically deformed, sufficient heat has been lost that the tube 1250 and the workpiece 1210 are fused or bonded together. The engagement motion ceases once the tube 1250 and the workpiece 1210 are bonded or fused together.

Figure 6A:
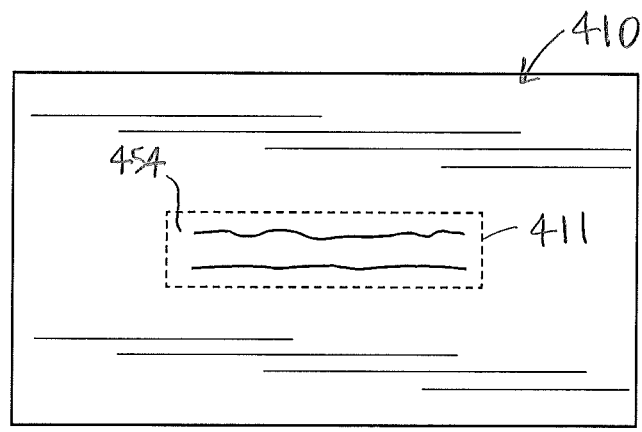
FIG. 6A is a plan view of a metal workpiece with a defective region therein, drawn at a smaller scale.
Figure 6B:
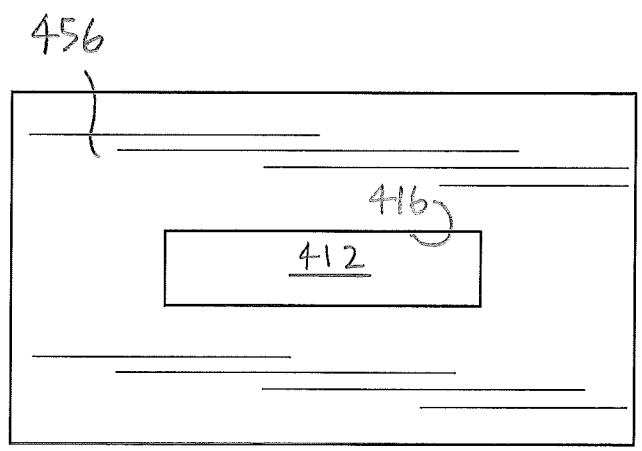
FIG. 6B is a plan view of the workpiece of FIG. 6A with the defective region removed therefrom, to provide an opening therein.

In another alternative embodiment illustrated in FIGS. 6A-6H, the method of the invention is for repairing a workpiece 410 including a defective region 411 thereof (FIG. 6A). Preferably, the method includes removing a portion 454 of the workpiece 410 that includes the defective region 411, to provide an opening 412 in a remaining portion 456 of the workpiece 410. The opening 412 is defined by one or more opening walls 416 having one or more opening wall surfaces 418 (FIGS. 6D, 6E) on the remaining portion 456 of the workpiece 410. In one embodiment, the opening wall surface 418 may, in part, be formed at a selected angle in order to engage with surfaces of a first insert 458.

Figure 6C:
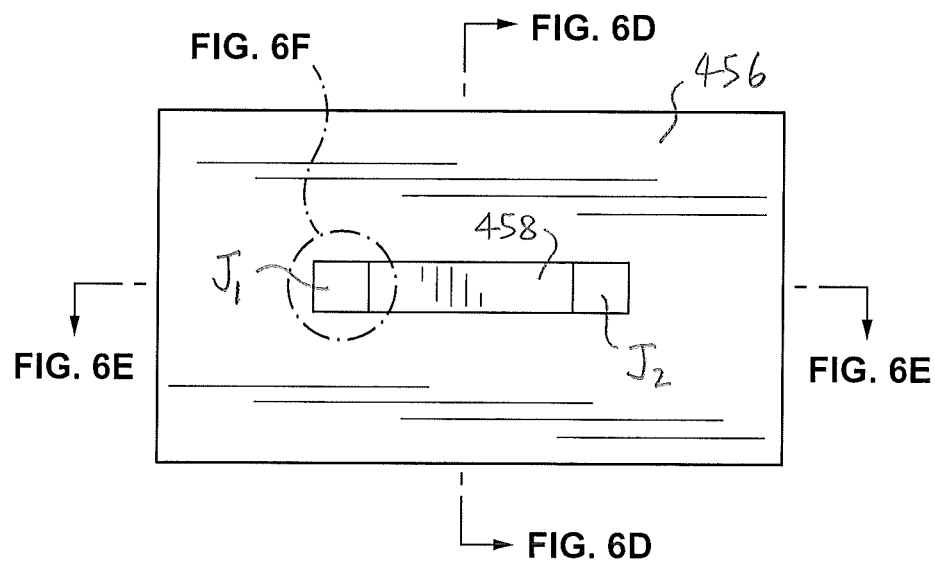
FIG. 6C is a plan view of the workpiece of FIGS. 6A and 6B with a first insert located in the opening, to provide a partially-repaired workpiece.
Figure 6D:
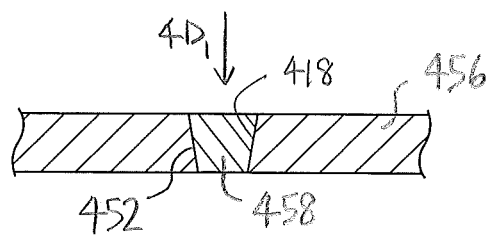
FIG. 6D is a cross-section of the partially-repaired workpiece of FIG. 6C.

Preferably, the first insert 458 is provided having a first insert material that is metallically bondable with the metal of the workpiece 410. It is preferred that the first insert 458 is formed to at least partially fit into at least a part of the opening 412, as shown in FIG. 6C. The first insert 458 has one or more first insert engagement surfaces 452 formed for engagement with the opening wall surface 418 (FIG. 6D). Preferably, the opening wall surface 418 is heated in a first non-oxidizing atmosphere to a hot working temperature at which the opening wall surface 418 is plastically deformable. It is also preferred that the first insert engagement surface 452 is heated in a second non-oxidizing atmosphere to the hot working temperature at which the first insert engagement surface 452 is plastically deformable.

The defective region 511 may be defective, or damaged, or altered in any way so that the defective region should be replaced. For instance, the defective region may be a portion of the workpiece that has corroded or weakened over time, or that includes pitting or cracking resulting from use. The defective region may alternatively include defects formed when the workpiece was manufactured.

It will be understood that heating elements and clamps and other elements that may be needed for the method are omitted from FIGS. 6A-6H for clarity of illustration.

The first insert 458 preferably is subjected to a first engagement motion, to move the first insert engagement surface 452 relative to the opening wall surface 418. While the first insert 458 is subjected to the first engagement motion, and while the first insert engagement surface 452 and the opening wall surface 418 are both at the hot working temperature, the first insert 458 preferably is also subjected to a first translocation motion to move the first insert 458 at least partially into the opening 412, for engaging the first insert engagement surface 452 with the opening wall surface 418 while the first insert 458 is subjected to the engagement motion, to cause plastic deformation of the opening wall surface 418 and of the first insert engagement surface 452 as they engage each other, for at least partially creating a metallic bond between the first insert 458 and the remaining portion 456 of the workpiece 410.

In FIG. 6D, the first insert 458 is shown located in the opening 412 and bonded with the remaining portion 456. It will also be understood that the first translocation motion would be in the direction indicated in FIG. 6D by arrow "4D$_1$".

Finally, the first insert 458 and the remaining portion 456 of the workpiece 410 preferably are permitted to cool, to provide a partially-repaired workpiece 460 (FIG. 6G) that includes the first insert 458 and the remaining portion of the workpiece 456 metallically bonded together (FIGS. 6C-6F).

As can be seen in FIGS. 6C-6F, it is preferred that the opening 412 is not fully occupied by the first insert 458. The partially-repaired workpiece 460, as illustrated in FIG. 6C, includes openings "J$_1$", "J$_2$", that are the parts of the opening 412 that remain unoccupied after the first insert 458 and the remaining portion 456 of the workpiece have been fused together, i.e., metallically bonded together, as described above.

Those skilled in the art would appreciate that, when the first insert engagement surface 452 and the opening wall surface 418 are engaged with each other and plastically deformed, some material may be extruded from between the engaged surfaces 452, 418. For example, in FIG. 6F, extruded material is shown located in the opening "J$_1$". For convenience, the extruded material is identified by reference characters "K$_1$", "K$_2$". It will be understood that the extruded material may be extruded at any point(s) where the first insert engagement surface(s) 452 and the opening wall surface(s) 418 meet. It is believed that the extruded material will tend to be extruded into a nearby void, e.g., the parts "J$_1$", "J$_2$".

Preferably, in order to complete the repair of the damaged region 411 of the workpiece, the parts "J$_1$", "J$_2$" of the opening 412 are to be filled, as will be described. In addition, however, in order to complete the repair of the damaged region 411, the extruded material "K$_1$", "K$_2$" preferably is removed.

Figure 6E:
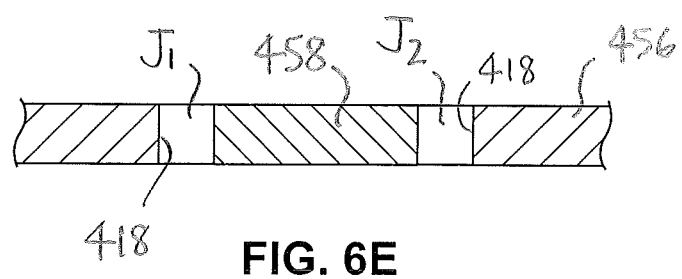
FIG. 6E is another cross-section of the partially-repaired workpiece of FIG. 6C.
Figure 6F:
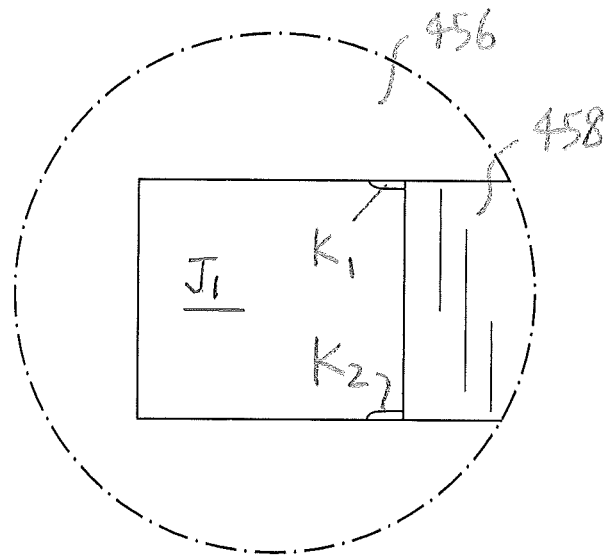
FIG. 6F is a plan view of a portion of the partially-repaired workpiece of FIG. 6C, drawn at a larger scale.
Figure 6G:
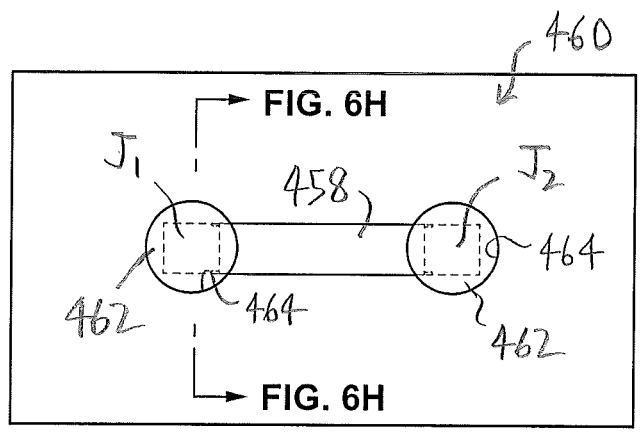
FIG. 6G is a plan view of the partially-repaired workpiece of FIG. 6C with supplementary openings formed therein, drawn at a smaller scale.

In order to achieve this, one or more supplementary openings 462 preferably are formed in the partially-repaired workpiece 460 (FIG. 6G). As can be seen in FIG. 6G, in one embodiment, it is preferred that there are two supplementary openings 462, i.e., each one encompassing the parts "J$_1$", "J$_2$" of the initial opening 412. Each supplementary opening 462 preferably is defined by one or more supplementary opening walls 464 that is at least partially located in the first insert 458, and at least partially located in what had been the remaining portion 456 of the workpiece 410. The supplementary opening wall 464 has one or more supplementary opening wall surfaces 466 (FIG. 6H).

Figure 6H:
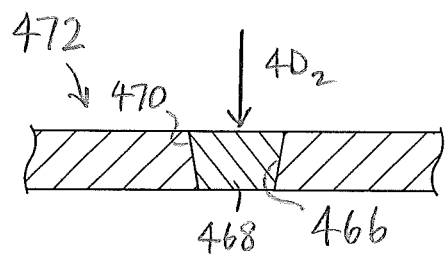
FIG. 6H is a cross-section of the workpiece of FIG. 6G with a second insert located in one of the supplementary openings, bonded with the partially-repaired workpiece.

It is also preferred that one or more second inserts 468 are provided that include a second insert material that is metallically bondable with the metal of the workpiece and the first insert (FIG. 6H). The second insert 468 preferably is formed to at least partially fit into the supplementary opening 462. The second insert 468 preferably includes one or more second insert engagement surfaces 470 (FIG. 6H) that are formed for engagement with the supplementary opening wall surface(s) 466.

Preferably, the supplementary opening wall surface 466 is heated in the non-oxidizing atmosphere to the hot working temperature, at which the supplementary opening wall surface 466 is plastically deformable. Similarly, it is preferred that the second insert engagement surface 470 is heated in the non-oxidizing atmosphere to the hot working temperature, at which the second insert engagement surface 470 is plastically deformable.

Preferably, the second insert 468 is subjected to a second engagement motion, to move the second insert engagement surface 470 relative to the supplementary opening wall surface 466. While the second insert 468 is subjected to the second engagement motion, and while the second insert engagement surface 470 and the supplementary opening wall surface 466 are at the hot working temperature, additionally the second insert 468 preferably is also subjected to a second translocation motion to move the second insert 468 at least partially into the supplementary opening intended for it, for engaging the second insert engagement surface 470 with the supplementary opening wall surface 466, to cause plastic deformation of the supplementary opening wall surface 466 and of the second insert engagement surface 470 as they engage each other, for at least partially creating a metallic bond between the second insert 468 and the partially-repaired workpiece 460.

In FIG. 6H, one of the second inserts 468 is shown located in one of the supplementary openings 462 and bonded with the partially-repaired workpiece 460. It will be understood that the second translocation motion would be in the direction indicated in FIG. 6H by arrow "4D$_2$".

It is also preferred that the second insert 468 and the partially-repaired workpiece 460 are allowed to cool, to form a repaired workpiece 472 (FIG. 6H) that includes the second insert 468 and the partially-repaired workpiece 460.

In the example illustrated in FIGS. 6G and 6H, there are two supplementary openings 462, and two second inserts 468 are at least partially located in the two supplementary openings 462 respectively. As can be seen in FIG. 6H, the second insert 468 preferably occupies the supplementary opening 462, and is metallically bonded with the partially-repaired workpiece 460. Accordingly, once the second inserts 468 are in the supplementary openings 462, the workpiece 410 is repaired, and may be put back into service.

From the foregoing, it can be seen that the embodiment of the method of the invention illustrated in FIGS. 6A-6H results in the repaired workpiece 472, in which the replacement of the damaged region 411 has been effected without creating heat-affected zones in the repaired workpiece 472.

It will be understood that the number, size and shape of the supplementary openings 462 may be any suitable number, size and shape. The first and second inserts 458, 468 may have any suitable configurations also.

For instance, in one embodiment, the supplementary opening 462 preferably is round in plan view. It is also preferred that the second insert 468 is a right circular cone.

Preferably, the second insert 468 is frustoconical (FIG. 6H). The engagement motion may be a rotational motion of the second insert 468.

It will be understood that heating elements and clamps are omitted from FIGS. 6A-6H for clarity of illustration.

It will also be understood that the translocation motion of the first insert and the second inserts may, alternatively, be directed from the interior of the pipe or tube workpiece toward its exterior, if the relevant elements are formed to accommodate this.

Those skilled in the art would appreciate that such method (and other embodiments of the method of the invention described herein) may be utilized in situ, e.g., where the workpiece 410 cannot be moved, or at least cannot conveniently be moved.

In the embodiment of the method of the invention illustrated in FIGS. 6A-6H, the first insert 458 substantially occupies the opening 412 in the workpiece 410. However, those skilled in the art would appreciate that, where the opening 412 is relatively long, maintaining a suitable engagement motion of the first insert 458 may not be practical, i.e., due to the length of the first insert 458. For example, a large pipe made of relatively thick rolled metal (e.g., such as the prior art example illustrated in FIG. 1A) may be several feet long, with a correspondingly long opening 12 therein. Also, where the opening to be filled is not generally straight (i.e., non-linear), it may not be feasible to utilize a single first insert to occupy most of the opening. An embodiment of a method of the invention intended to address these situations is disclosed in FIGS. 7A-7F.

It will be understood that the embodiment of the method of the invention illustrated in FIGS. 7A-7F may be utilized to complete or finish a workpiece, or to repair a damaged or worn workpiece.

Figure 7A:
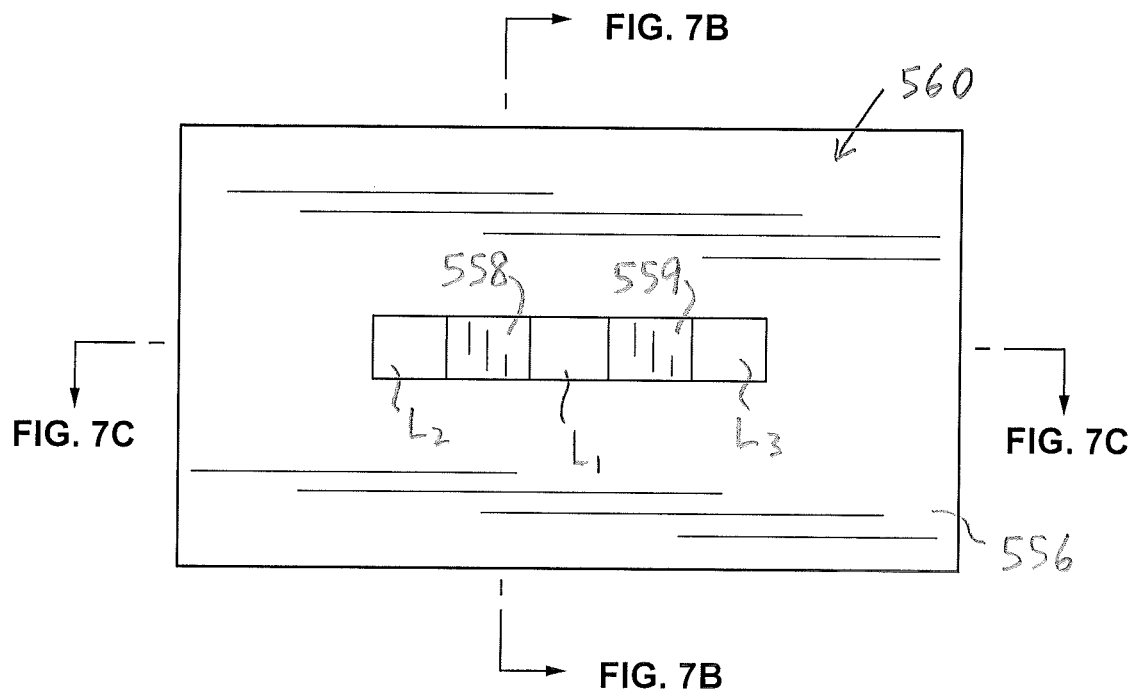
FIG. 7A is a plan view of another partially-repaired workpiece, drawn at a smaller scale.

A partially-modified workpiece 560 is illustrated in FIG. 7A. A body portion 556 of the workpiece is shown, the body portion being the portion of the workpiece that defines an opening in the body portion 556.

As illustrated in FIG. 7A, the original opening in the workpiece 560 is partially occupied by left and right first inserts 558, 559, which are spaced apart from each other by an opening "$L_1$". The partially-modified workpiece 560 includes the body portion 556, and the left and right first inserts 558, 559. The left and right first inserts 558, 559 also define openings "$L_2$", "$L_3$" at their respective ends. The openings "$L_1$", "$L_2$", and "$L_3$" are parts of the original opening in the workpiece that remain unoccupied after the left and right first inserts 558, 559 are bonded to the body portion 556 (FIGS. 7A-7C).

It will be understood that the left and right first inserts 558, 559 are bonded with the body portion 556 using the embodiment of the method of the invention described above, e.g., such as the method used in connection with bonding the first insert 458 to the remaining portion 456 (FIGS. 6C-6E). Those skilled in the art would appreciate that the left and right first inserts 558, 559 are not required to be bonded simultaneously with the body portion 556. It is expected that, due to space constraints, bonding one of the first inserts with the body portion 556, and then bonding the other first insert with the body portion 556, is likely to be preferred in practice.

Figure 7B:
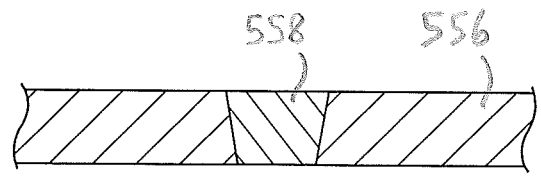
FIG. 7B is a cross-section of the partially-repaired workpiece of FIG. 7A.
Figure 7C:
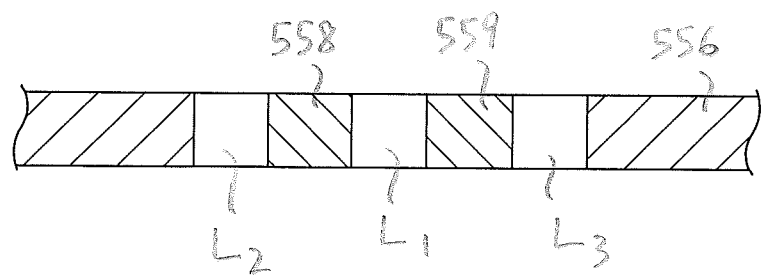
FIG. 7C is another cross-section of the partially-repaired workpiece of FIG. 7A.

The heating elements and other elements needed for bonding the left and right first inserts 558, 559 with the body portion 556 are omitted from FIGS. 7A-7C for clarity of illustration.

It will be understood that some extruded material (not shown) may be extruded into the openings "$L_1$"-"$L_3$".

It will also be understood that only two first inserts are illustrated in order to simplify the illustration. Those skilled in the art would appreciate that there may be any suitable number of first inserts, with a corresponding number of openings therebetween, depending on (among other things) the overall length of the opening that is to be filled.

Figure 7D:
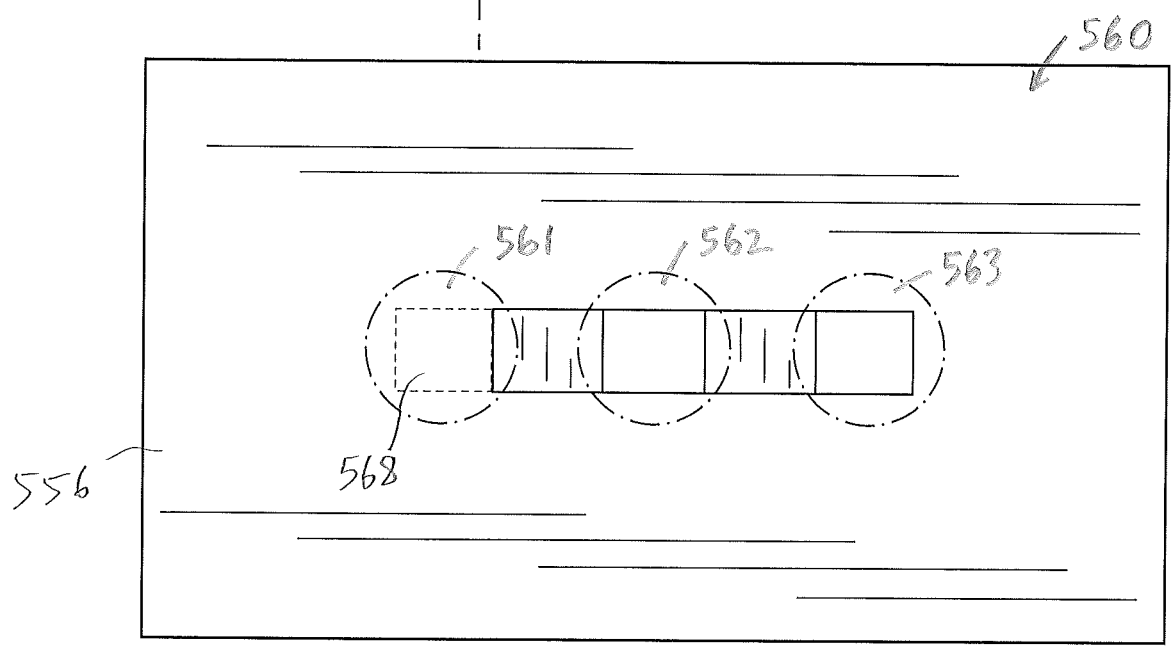
FIG. 7D is a plan view of the partially-repaired workpiece of FIG. 7A with supplementary openings formed therein, drawn at a smaller scale.

In order to fill the openings "$L_1$"-"$L_3$", and also to remove the extruded material therein, supplementary openings 561, 562, and 563 preferably are formed in the partially-modified workpiece 560 (FIG. 7D). The supplementary openings 561, 562, 563 may be formed in any suitable manner. As can be seen in FIG. 7D, it is preferred that the supplementary opening 561, once formed, encompasses the opening "$L_2$". The other supplementary openings 562, 563 preferably encompass the openings "$L_1$" and "$L_3$" respectively.

Preferably, second inserts 568 are provided that include second insert material that is bondable with the metal of the body portion 556, and with the metal of the left and right first inserts 558, 559. The second inserts 568 preferably are formed to fit into each of the supplementary openings 561, 562, 563. For clarity of illustration, in FIG. 7D, one of the second inserts 568 is shown located in the supplementary opening 561.

Figure 7E:
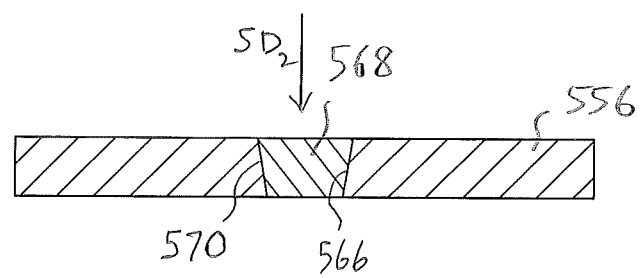
FIG. 7E is a cross-section of the workpiece of FIG. 7D with a second insert located in one of the supplementary openings, bonded with the partially-repaired workpiece.

Each of the supplementary openings 561, 562, 563 preferably is at least partially defined by a supplementary opening wall surface 566 (FIG. 7E). Also, each of the second inserts 568 preferably is partially defined by one or more insert engagement surfaces 570 (FIG. 7E) that are formed for engagement with the supplementary opening wall surface 566 of one of the supplementary openings 561, 562, 563.

Preferably, each of the supplementary opening wall surfaces 566 is heated in the non-oxidizing atmosphere to the hot working temperature, at which the supplementary opening wall surface 566 is plastically deformable. Similarly, it is preferred that the second insert engagement surface 570 of each second insert 568 is heated in the non-oxidizing atmosphere to the hot working temperature, at which the second insert engagement surface 570 is plastically deformable.

Preferably, the second insert 568 is subjected to a second engagement motion, to move the second insert engagement surface 570 relative to the supplementary opening wall surface 566 that the second insert 568 is positioned to engage. While the second insert 568 is subjected to the second engagement motion, and while the second insert engagement surface 570 and the supplementary opening wall surface 566 are at the hot working temperature, additionally the second insert 568 preferably is also subjected to a second translocation motion to move the second insert 568 at least partially into the supplementary opening intended for it, for engaging the second insert engagement surface 570 with the supplementary opening wall surface 566 thereof, to cause plastic deformation of the supplementary opening wall surface 566 and of the second insert engagement surface 570 as they engage each other, for at least partially creating a metallic bond between the second insert 568 and the partially-repaired workpiece 560.

In FIGS. 7D and 7E, one of the second inserts 568 is shown located in one of the supplementary openings 561 and bonded with the partially-modified workpiece 560. It will be understood that the second translocation motion would be in the direction indicated in FIG. 7E by arrow "$5D_2$".

It is also preferred that the second insert 568 and the partially-modified workpiece 560 are allowed to cool, to form a modified workpiece 572 (FIG. 7F) that includes the second inserts 568 (i.e., one second insert 568 being located in each of the supplementary openings 561, 562, 563 respectively) and the partially-modified workpiece 560.

Figure 7F:
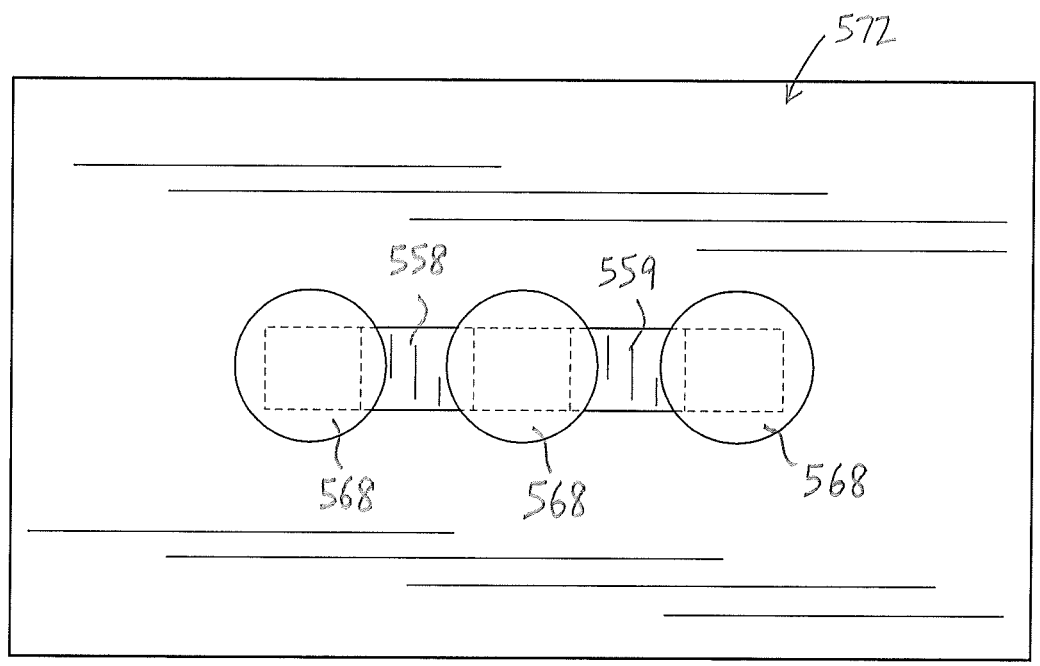
FIG. 7F is a plan view of the workpiece of FIGS. 7A-7E, repaired.

In the example illustrated in FIGS. 7D, 7E, and 7F, there are three supplementary openings 561, 562, and 563, and three second inserts 568 are at least partially located in the three supplementary openings 561, 562, and 563 respectively. As can be seen in FIG. 7D, the second insert 568 preferably occupies the supplementary opening 561, and is metallically bonded with the partially-modified workpiece 560. Accordingly, once the second inserts 568 are in the supplementary openings 561, 562, and 563, the workpiece is modified, and may be utilized.

In one embodiment, each supplementary opening preferably is round in plan view. It is also preferred that the second insert 568 is a right circular cone. Preferably, the second insert 568 is frustoconical (FIG. 7E). The engagement motion may be a rotational motion of the second insert 568.

It will be understood that the number, size and shape of the supplementary openings may be any suitable number, size and shape. The first and second inserts 558, 559, 568 may have any suitable configurations also. The embodiment of the method as illustrated in FIGS. 7A-7F is exemplary only. The process may involve any suitable number of first inserts, and therefore also may involve any suitable number of supplementary openings and second inserts.

Those skilled in the art would appreciate that the embodiment of the method illustrated in FIGS. 7A-7F may also be utilized to fill openings in the workpiece that are not elongate and straight. For example, such embodiment may be utilized to fill an elongate opening that is not linear (i.e., straight) along its length, but is instead non-linear. This may be accomplished by dividing the non-linear opening into a series of smaller linear segments, each linear segment being filled by one or more first inserts and one or more second inserts, as described above.

From the foregoing, it can be seen that the embodiment of the method of the invention illustrated in FIGS. 7A-7F results in the modified workpiece 572, in which the replacement of the damaged region has been effected without creating heat-affected zones in the modified workpiece 572.

It will be understood that heating elements and clamps are omitted from FIGS. 7A-7F for clarity of illustration.

It will also be understood that the translocation motion of the first inserts and the second inserts may, alternatively, be directed radially outwardly from the interior of the pipe or tube workpiece toward its exterior, where the relevant elements are formed to accommodate this.

Those skilled in the art would appreciate that such method (and other embodiments of the method of the invention described herein) may be utilized in situ, e.g., where the workpiece cannot be moved, or at least cannot conveniently be moved.

It will be appreciated by those skilled in the art that the invention can take many forms, and that such forms are within the scope of the invention as claimed. The scope of the claims should not be limited by the preferred embodiments set forth in the examples, but should be given the broadest interpretation consistent with the description as a whole.

I claim:

1. A method of attaching a metal tube having a tube wall defining a tube channel therein to a metal workpiece having a workpiece wall, the method comprising the steps of:

(a) forming a workpiece opening in the workpiece wall, the workpiece opening being at least partially defined by a workpiece opening wall surface in the workpiece wall;
    (b) forming a tube engagement surface on the tube wall that is formed for engagement with the workpiece opening wall surface;
    (c) positioning at least one heating element in a predetermined position relative to the workpiece opening wall surface and the tube engagement surface;
    (d) energizing said at least one heating element in a non-oxidizing atmosphere;
    (e) with said at least one energized heating element, in the non-oxidizing atmosphere, heating a workpiece heated portion that extends into the workpiece wall from the workpiece opening wall surface to a hot working temperature, at which the workpiece heated portion is at least partially plastically deformable;
    (f) with said at least one energized heating element, in the non-oxidizing atmosphere, heating a tube heated portion that extends into the tube wall from the tube engagement surface to the hot working temperature, at which the tube heated portion is at least partially plastically deformable;
    (g) while said workpiece heated portion and said tube heated portion are at the hot working temperature, subjecting the tube to an engagement motion, to move the tube engagement surface relative to the workpiece opening wall surface;
    (h) while the tube is subjected to the engagement motion, and while said workpiece heated portion and said tube heated portion are at the hot working temperature, subjecting the tube to a translocation motion, to push the tube engagement surface against the workpiece opening wall surface while the tube is subjected to the engagement motion;
    (i) while the tube is subjected to the engagement motion, and while said tube heated portion and said workpiece heated portion are at the hot working temperature, pressing the tube engagement surface against the workpiece opening wall surface, to cause plastic deformation of said workpiece heated portion and of said tube heated portion as they engage each other, for creating a metallic bond between the tube and the workpiece; and
    (j) allowing the tube and the workpiece to cool, to bond the tube and the workpiece together.

2. The method according to claim 1 in which the engagement motion is an oscillation.

3. The method according to claim 1 in which the tube engagement surface and the workpiece opening wall surface are formed to mate with each other.

4. The method according to claim 3 in which the tube engagement surface is planar and the workpiece opening wall surface is planar.

5. The method according to claim 4 in which:
    the tube wall defines a tube axis thereof; and
    the tube engagement surface defines a tube engagement surface plane
    that is located at an acute angle relative to the tube axis.

6. The method according to claim 4 in which:
    the tube wall defines a tube axis thereof; and
    the tube engagement surface defines a plurality of tube engagement surfaces that are positioned at respective predetermined angles relative to the tube axis, to mate with respective corresponding workpiece engagement surfaces in the workpiece.

7. The method according to claim 4 in which:
the tube wall defines a tube axis, and the tube engagement surface defines a tube engagement surface plane that is located to define a first angle relative to the tube axis;
the workpiece opening wall surface defines a workpiece opening axis;
the workpiece opening surface defines a workpiece engagement plane that is located to define the first angle relative to the workpiece opening axis;
the workpiece engagement plane defines a second angle relative to an outer surface of the workpiece; and
the first and second angles are complementary.

* * * * *